United States Patent
Yano et al.

(10) Patent No.: US 8,615,375 B2
(45) Date of Patent: Dec. 24, 2013

(54) MOTION DETERMINATION APPARATUS AND MOTION DETERMINATION METHOD

(75) Inventors: Ai Yano, Kawasaki (JP); Ryuichi Matsukura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 400 days.

(21) Appl. No.: 13/025,291

(22) Filed: Feb. 11, 2011

(65) Prior Publication Data

US 2011/0231148 A1    Sep. 22, 2011

(30) Foreign Application Priority Data

Mar. 19, 2010   (JP) ................................. 2010-063656

(51) Int. Cl.
*G01C 9/00*   (2006.01)
*G06F 3/033*   (2013.01)

(52) U.S. Cl.
USPC ............................ 702/150; 715/863; 345/158

(58) Field of Classification Search
USPC ................. 702/150, 85, 92, 94–95, 127, 141,
702/151–153, 189, 199; 345/156, 158, 162,
345/581, 619, 650, 652, 659, 672–673;
382/103, 107, 159, 181, 190, 224;
715/863

See application file for complete search history.

(56) References Cited

FOREIGN PATENT DOCUMENTS

| JP | 11-120360 | 4/1999 |
|---|---|---|
| JP | 2006-139537 | 6/2006 |
| JP | 2008-192004 | 8/2008 |
| JP | 2009-245176 A | 10/2009 |

OTHER PUBLICATIONS

Wu et al., Gesture Recognition with a 3-D Accelerometer, 2009, UIC 2009, LNCS 5585, pp. 25-38.*
Japanese Office Action mailed Jul. 30, 2013 in corresponding Japanese Patent Application No. 2010-063656 (3 pages) (2 pages English Translation).

* cited by examiner

*Primary Examiner* — Toan Le
(74) *Attorney, Agent, or Firm* — Staas & Halsey LLP

(57) ABSTRACT

According to an aspect of the invention, a motion determination apparatus, acquires, at regular intervals, detection information indicating a change in a position of and/or a posture of a motion sensor and/or a device including the motion sensor, and stores the detection information with time information of acquisition time of the detection information mapped thereto; calculates from the detection information a plurality of feature quantities indicating features at a plurality of different time points; and determines a motion applied to the motion sensor and/or the device including the motion sensor in response to a feature quantity.

10 Claims, 36 Drawing Sheets

FRONT VIEW

SIDE VIEW

PERSPECTIVE VIEW

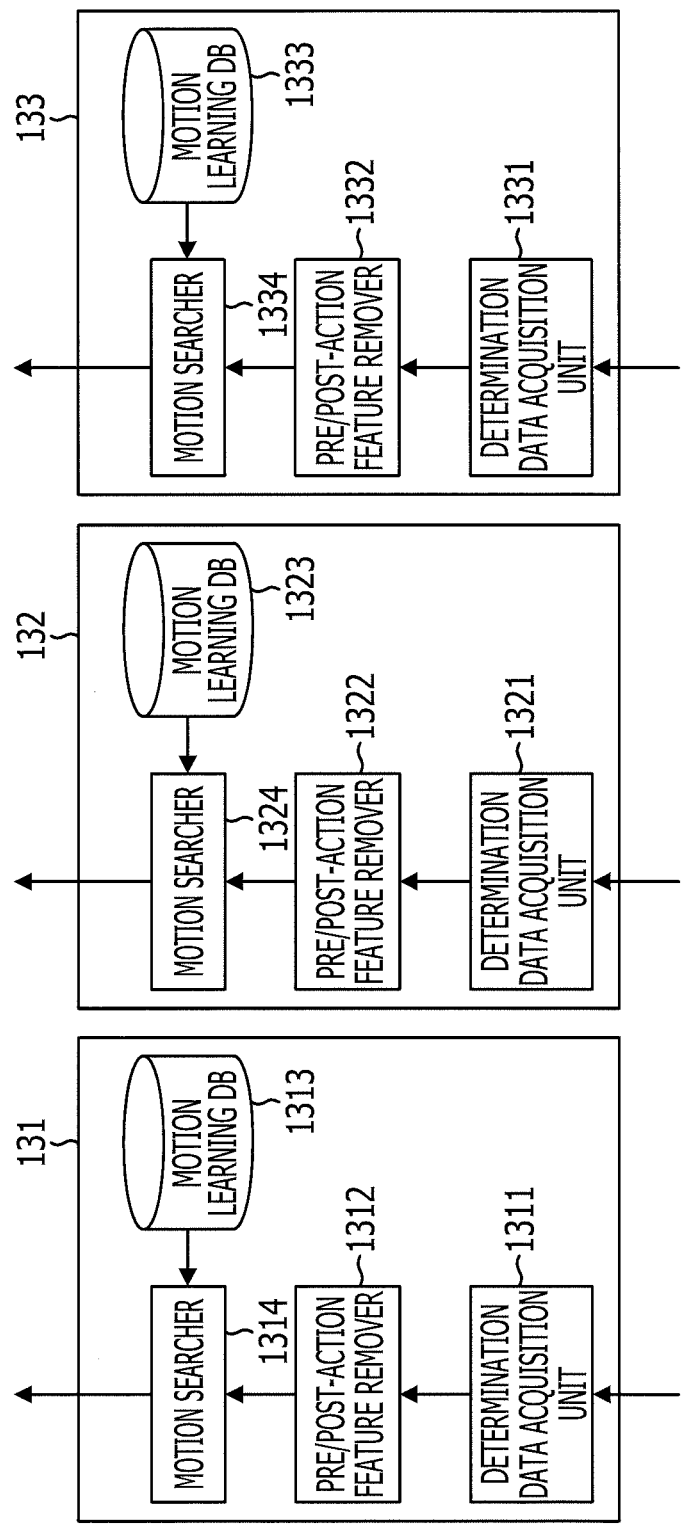

| MOTION | ACCELERATION SENSOR DATA | | |
|---|---|---|---|
| | VARIANCE VALUE | AVERAGE VALUE | ANGLE |
| FORWARD TILT / SHAKE | | Z : PLUS | Z : MINUS |
| BACKWARD TILT / SHAKE | | Z : MINUS | Z : PLUS |
| RIGHT TILT / SHAKE | | Y : MINUS | Y : PLUS |
| LEFT TILT / SHAKE | | Y : PLUS | Y : MINUS |
| FORWARD MOVE | LARGER THAN MAX 2 BY NUM 2 | Z : MINUS | Z : TO WITHIN BASE ± THRESHOLD VALUE |
| BACKWARD MOVE | | Z : PLUS | Z : TO WITHIN BASE ± THRESHOLD VALUE |
| UP MOVE | | X : PLUS | X : TO WITHIN BASE ± THRESHOLD VALUE |
| DOWN MOVE | | X : MINUS | X : TO WITHIN BASE ± THRESHOLD VALUE |
| RIGHT MOVE | | Y : PLUS | Y : TO WITHIN BASE ± THRESHOLD VALUE |
| LEFT MOVE | | Y : MINUS | Y : TO WITHIN BASE ± THRESHOLD VALUE |

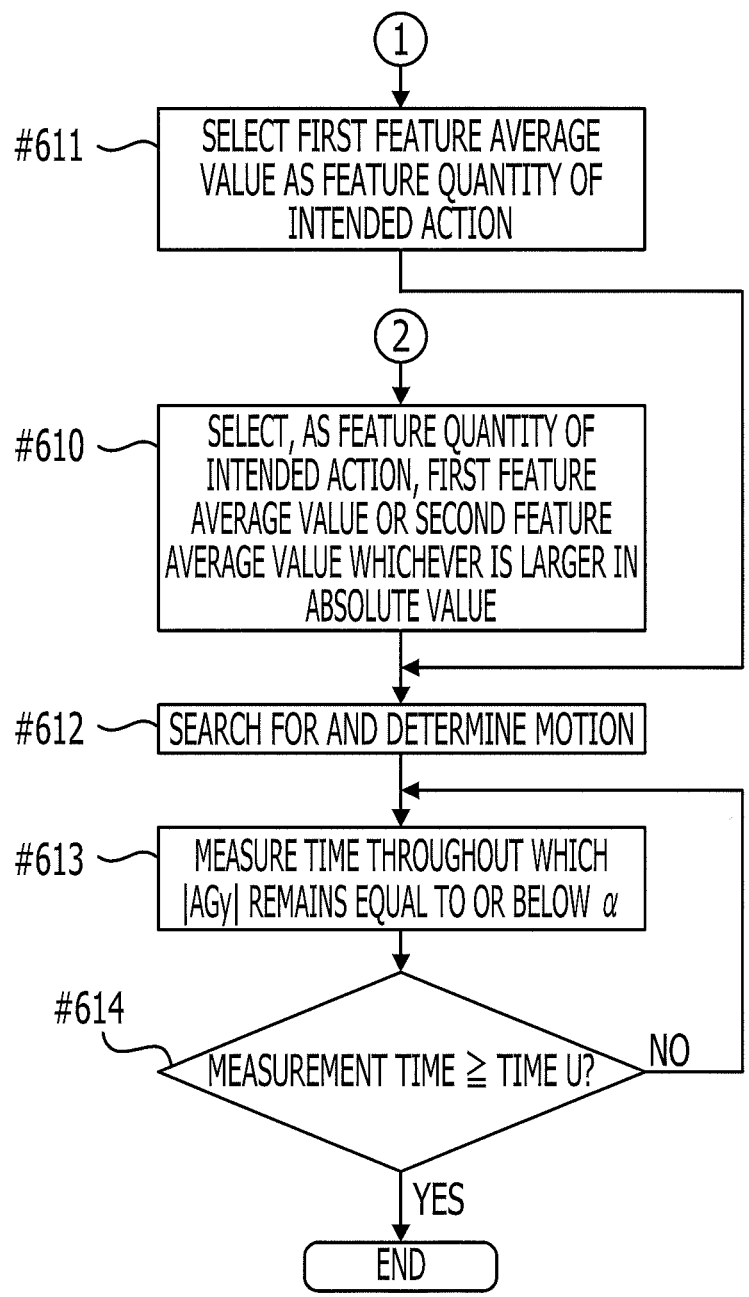

FIG. 11

| FEATURE TYPE | VALUE |
|---|---|
| AVERAGE VALUE | 0.2 |
| VARIANCE VALUE | 0.01 |
| ANGLE | 60 |

FIG. 20

| ANGLE θ3 | TIME R |
|---|---|
| EQUAL TO OR LARGER THAN 0° AND SMALLER THAN 30° | 300 MILLISECONDS |
| EQUAL TO OR LARGER THAN 30° AND SMALLER THAN 60° | 200 MILLISECONDS |
| EQUAL TO OR LARGER THAN 60° AND SMALLER THAN 90° | 100 MILLISECONDS |

| FIRST MOTION | SECOND MOTION | THIRD MOTION | FINAL MOTION | |
|---|---|---|---|---|
| FORWARD TILT | FORWARD TILT | ... | FORWARD TILT | ~58 |
| LEFT TILT | FORWARD TILT | ... | FORWARD TILT | ~58 |
| BACKWARD TILT | FORWARD TILT | ... | FORWARD TILT | ~58 |
| BACKWARD TILT | BACKWARD TILT | ... | BACKWARD TILT | ~58 |
| LEFT TILT | BACKWARD TILT | ... | BACKWARD TILT | ~58 |
| FORWARD TILT | BACKWARD TILT | ... | BACKWARD TILT | ~58 |
| RIGHT TILT | RIGHT TILT | ... | RIGHT TILT | ~58 |
| LEFT TILT | RIGHT TILT | ... | RIGHT TILT | ~58 |
| FORWARD TILT | RIGHT TILT | ... | RIGHT TILT | ~58 |
| LEFT TILT | LEFT TILT | ... | LEFT TILT | ~58 |
| RIGHT TILT | LEFT TILT | ... | LEFT TILT | ~58 |
| FORWARD TILT | LEFT TILT | ... | LEFT TILT | ~58 |
| ... | ... | ... | ... | ~58 |

| POSTURE | UP-DOWN AXIS | FORE-AFT AXIS |
|---|---|---|
| VERTICAL | X AXIS | Z AXIS |
| HORIZONTAL | Y AXIS | Z AXIS |

| APPLICATION | ACTIVE AXIS | INACTIVE AXIS |
|---|---|---|
| PEDOMETER | UP-DOWN AXIS | |
| MOTION UI | | FORE-AFT AXIS |
| | | |

| X-AXIS | Y-AXIS | Z-AXIS |
|---|---|---|
| | RIGHT TILT | LEFT TILT |

FIG. 32

| SUCCESS/FAILURE DETERMINATION RESULT | FINAL MOTION | X-AXIS CANDIDATE MOTION | Y-AXIS CANDIDATE MOTION | Z-AXIS CANDIDATE MOTION |
|---|---|---|---|---|
| FAILURE | FORWARD TILT | FORWARD MOVE | BACKWARD TILT | NONE |
| SUCCESS | BACKWARD TILT | FORWARD TILT | BACKWARD TILT | NONE |
| ... | ... | ... | ... | ... |

FIG. 33

| MOTION | INSTRUCTION (OPERATION) |
|---|---|
| FORWARD TILT TERMINAL | SCROLL DOWN SCREEN |
| BACKWARD TILT TERMINAL | SCROLL UP SCREEN |
| RIGHT TILT TERMINAL | TURN TO NEXT PAGE |
| LEFT TILT TERMINAL | TURN TO PREVIOUS PAGE |
| TAP TOP SIDE OF FRAME OF TERMINAL TWICE | RETURN BACK TO LAUNCHER (INITIAL) SCREEN |
| TAP RIGHT SIDE OF FRAME OF TERMINAL TWICE | DISPLAY SUBMENU |

MOTION DETERMINATION APPARATUS AND MOTION DETERMINATION METHOD

CROSS-REFERENCE TO RELATED APPLICATIONS

This application is based upon and claims the benefit of priority of the prior Japanese Patent Application No. 2010-063656, filed on Mar. 19, 2010, the entire contents of which are incorporated herein by reference.

FIELD

The embodiments relate an apparatus determining a motion of an apparatus.

BACKGROUND

Motion sensors are today typically mounted on devices such as a cellular phone, a smart phone, a personal digital assistant (PDA), and a mobile game-playing device. The motion sensor detects a motion of a device imparted by a user of the device. The motion sensors include an acceleration sensor, a gyroscope, and a geomagnetic sensor.

Operating a motion user interface (UI) is easier than operating a mouse, a keyboard, a touch panel, or a pen. According to Japanese Laid-open Patent Publication No. 11-120360, the motion UI draws attention as a UI for operating a device simply.

Several methods and apparatuses have been proposed to identify motion. For example, an input information processing apparatus proposed includes a signal separator that separates a signal measured by an acceleration sensor mounted on a user into an acceleration signal and a muscle sound signal, and a controller controlling an operation of a user operation target in response to the acceleration signal and the muscle sound signal (as described Japanese Laid-open Patent Publication No. 2008-192004).

According to the following proposed method, a mobile terminal main body is moved in accordance with a specific operation pattern, and an acceleration of the motion of the mobile terminal main body is detected when the mobile terminal main body is moved in accordance with the specific operation pattern. In a preliminary phase to the identification of the operation pattern of the mobile terminal responsive to the detected acceleration, it is verified whether a still state in which the acceleration of the mobile terminal is equal to or below a set threshold value has continued for a specific period of time. If the still state has continued for the specific period of time, the operation is identified (as described in Japanese Laid-open Patent Publication No. 2006-139537).

SUMMARY

According to an aspect of the invention, a motion determination apparatus, includes: a detection information acquisition unit for acquiring, at regular intervals, detection information indicating a change in a position of and/or a posture of a motion sensor and/or a device including the motion sensor, and storing the detection information with time information of acquisition time of the detection information mapped thereto; a feature quantity calculator for calculating from the detection information a plurality of feature quantities indicating features at a plurality of different time points; and a motion determiner for determining a motion applied to the motion sensor and/or the device including the motion sensor in response to a feature quantity.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates a configuration of a motion determiner;

FIG. 5 illustrates an example of a motion learning database and motion feature data;

FIGS. 6A and 6B are a flowchart illustrating an example of the process flow of an axis-based determination process;

FIG. 11 illustrates an example of a feature quantity of an intended action;

FIG. 20 illustrates a relationship between the angle $\theta 3$ and a time period R;

FIG. 23 illustrates an example of a meta knowledge database and meta knowledge data;

FIGS. 29A-29C illustrate an example of a posture table, an application-based active axis table, and a motion candidate table, respectively;

FIG. 32 illustrates an example of an final motion and failure/success determination results thereof; and FIG. 33 illustrates a relationship between motion and instruction.

DESCRIPTION OF EMBODIMENTS

Even if a user thinks he has provided the same instruction to a device using a motion UI, a habit of the user of the device may cause a motion sensor to determine that a motion different from that intended by the user has been made. When the user provides an instruction to the device, a motion corresponding to another instruction and other than the motion of the intended instruction may be generated. In such a case, the device determines that an unintended motion is also performed in addition to the motion intended by the user.

Figure 1A:
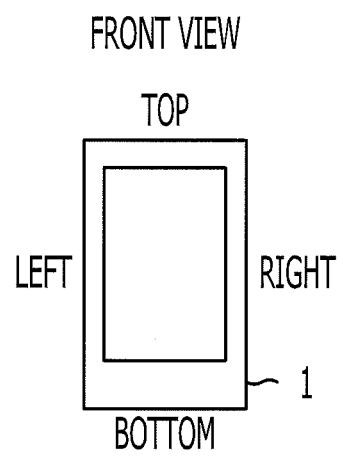
FIGS. 1A-1C illustrate an external view of a mobile terminal.
Figure 1B:
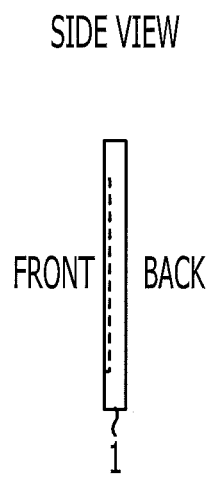
Figure 1C:
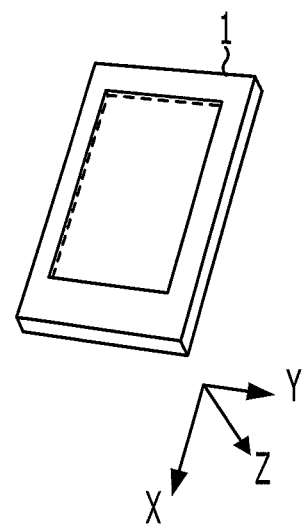
Figure 2:
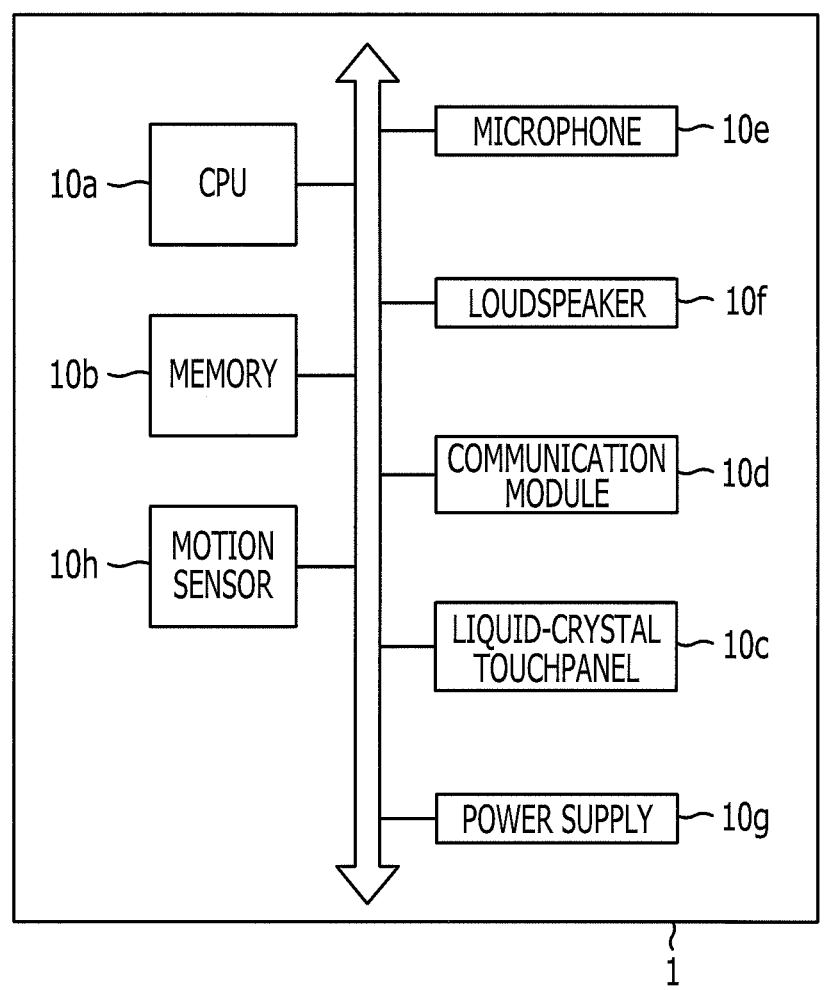
FIG. 2 illustrates a hardware configuration of the mobile terminal.
Figure 3:
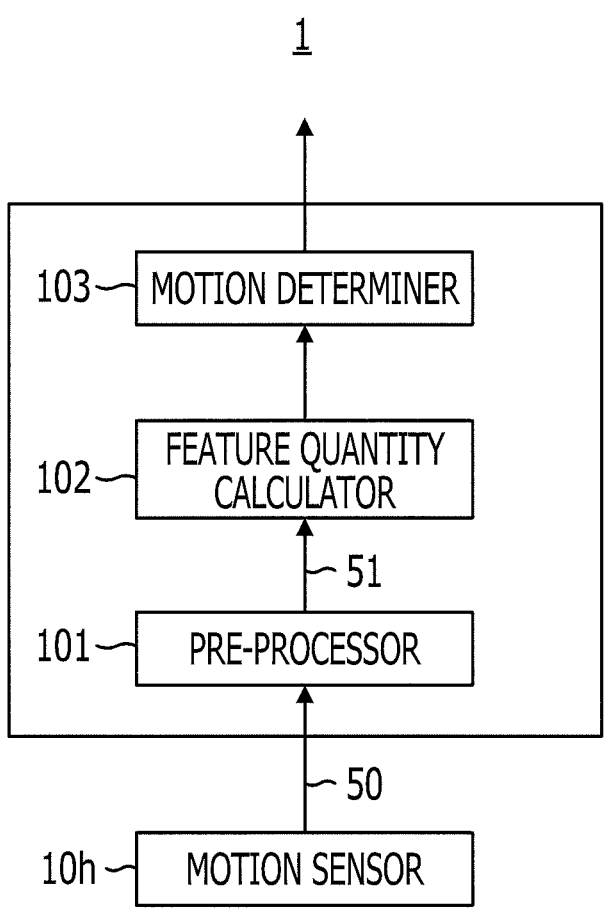
FIG. 3 illustrates a functional configuration example of the mobile terminal.

FIGS. 1A-1C are the external view of a mobile terminal 1. FIG. 2 illustrates a hardware configuration of the mobile terminal 1. FIG. 3 illustrates a functional configuration of the mobile terminal 1. FIG. 4 illustrates a configuration of the motion determiner 103. FIG. 5 illustrates an example of motion learning databases 1313, 1323, and 1333, and motion feature data 57.

The mobile terminal 1 is an apparatus having a function of communicating with another apparatus via a cellular phone network. The mobile terminal 1 is housed in a palm-sized and rectangular parallelepiped casing. As illustrated in FIGS. 1A-1C, an axis aligned with the height of mobile terminal 1, an axis aligned with the width of the mobile terminal 1, and an axis aligned with the thickness of the mobile terminal 1 are respectively defined by "X axis," "Y axis," and "Z axis." A plus direction (+) and a minus direction (−) of each axis are also defined as illustrated in FIG. 1C.

As illustrated in FIG. 2, the mobile terminal 1 includes central processing unit (CPU) 10a, memory 10b, liquid-crystal touch panel 10c, communication module 10d, microphone 10e, loudspeaker 10f, power supply 10g, and motion sensor 10h.

The liquid-crystal touch panel 10c is of the liquid-crystal type. A variety of images is displayed on the liquid-crystal touch panel 10c in response to an instruction from the user. The liquid-crystal touch panel 10c also detects a location thereof touched by the user, and sends a signal indicating the location to the CPU 10a.

Referring to FIGS. 1A-1C, the mobile terminal 1 includes the liquid-crystal touch panel 10c arranged on the substantially whole area of the front thereof. The mobile terminal 1 may also include buttons such as numerical keys together with the liquid-crystal touch panel 10c.

The communication module 10d performs a wireless communication with a base-station. The microphone 10e collects a sound and converts the sound into a digital signal. The loudspeaker 10f outputs a sound in response to a digital signal received by the communication module 10d.

The power supply 10g supplies power to each hardware element in the mobile terminal 1 from a battery or a commercial power supply.

The motion sensor 10h detects a motion of the mobile terminal 1. The motion sensor 10h may be one or more of an acceleration sensor, an angular speed sensor, a gyroscope, or a geomagnetic sensor.

If a three-axis acceleration sensor is used for the motion sensor 10h, the acceleration in each direction of the X axis, Y axis, and Z axis is measured. A combination of the accelerations at the three axes represents a posture of the mobile terminal 1. A change in the position or the posture of the mobile terminal 1, i.e., a motion of the mobile terminal 1 (including action and gesture) is detected by continuously measuring the acceleration in each direction.

If a three-axis acceleration sensor is used for the motion sensor 10h, an angular acceleration about each of the X axis, Y axis, and Z axis as an axis of rotation is measured. A combination of the angular accelerations at the three axes represents a posture of the mobile terminal 1. A change in the position or the posture of the mobile terminal 1, i.e., a motion of the mobile terminal 1 (action) is detected by continuously measuring the angular acceleration in each direction.

The motion sensor 10h measures a value representing the posture of the mobile terminal 1. The mobile terminal 1 may detect the motion imparted thereto by observing a change in the value.

The memory 10b stores data and programs performing the functions of a pre-processor 101, a feature quantity calculator 102, and a motion determiner 103 illustrated in FIG. 3. These programs are executed by the CPU 10a.

The user may provide a variety of instructions to the mobile terminal 1 by performing a specific motion (action) on the entire mobile terminal 1. By moving the mobile terminal 1 right, the user provides an instruction to scroll a screen.

The motion determiner 103 performs the motion determination in cooperation with the motion sensor 10h and the pre-processor 101 and the feature quantity calculator 102 of FIG. 3. The motion determiner 103 detects and excludes the habit of the user. The motion determination is thus performed more accurately than before. The process of the motion sensor 10h and each element of FIG. 3 is successively described.

The motion sensor 10h continuously measures the acceleration and the angular acceleration. Data indicating a change in the acceleration or the angular acceleration in each axis is thus obtained. The data is hereinafter referred to as "change data 50."

The pre-processor 101 performs a noise removal process on the change data 50. The noise removal process may be performed using a low-pass filter (LPF). The change data 50 having undergone the noise removal process is hereinafter referred to as "change data 51."

The feature quantity calculator 102 calculates the average value and the variance value of one of the acceleration and the angular acceleration indicated by the change data 51 on a per axis basis of the X axis, the Y axis, and the Z axis. Through a calculation method such as fast Fourier transform (FFT), the feature quantity calculator 102 calculates a feature quantity appearing in the change data 51 and indicating the action of the mobile terminal 1.

Average value AG, variance value VA, and angle DA as feature quantities are calculated for each of the X axis, the Y axis, and the Z axis. The average values AG for the X axis, the Y axis, and the Z axis are ended with subscripts x, y, and z, respectively, i.e., "average value AGx," "average value AGy," and "average value AGz." This designation is also true of the variance value VA and the angle DA.

In the discussion that follows, the average value of acceleration is used as an average value AG. The acceleration is obtained every specific period of time (every few milliseconds to tens of milliseconds). Each time up to two accelerations are measured, the feature quantity calculator 102 calculates the average value of the two accelerations as an average value AG. Each time up to four accelerations are measured, the feature quantity calculator 102 calculates the average value of the four accelerations as an average value AG. A variance value of the four accelerations is measured as a variance value VA. The angle DA is an angle made by each axis with respect to a surface in relation to the mobile terminal 1, for example, the ground. For example, an angle DAy is an angle between the Y axis and the ground.

As illustrated in FIG. 4, the motion determiner 103 includes first motion determiner 131, second motion determiner 132, and third motion determiner 133. The motion determiner 103 thus constructed determines a motion acted on the mobile terminal 1 in accordance with the average value AG, the variance value VA, and the angle DA calculated by the feature quantity calculator 102.

The first motion determiner 131 includes determination data acquisition unit 1311, pre/post-action feature quantity remover 1312, motion learning database 1313, and motion searcher 1314. The first motion determiner 131 thus constructed determines the motion acted on the mobile terminal 1 in accordance with the feature quantities of the X axis, i.e., the average value AGx, the variance value VAx, and the angle DAx.

Similarly, the second motion determiner 132 includes determination data acquisition unit 1321, pre/post-action feature quantity remover 1322, motion learning database 1323, and motion searcher 1324. The second motion determiner 132 thus constructed determines the motion acted on the mobile terminal 1 in accordance with the feature quantities of the Y axis, i.e., the average value AGy, the variance value VAy, and the angle DAy.

Furthermore, the third motion determiner 133 includes determination data acquisition unit 1331, pre/post-action feature quantity remover 1332, motion learning database 1333, and motion searcher 1334. The third motion determiner 133 thus constructed determines the motion acted on the mobile terminal 1 in accordance with the feature quantities of the Z axis, i.e., the average value AGz, the variance value VAz, and the angle DAz.

The first motion determiner 131, the second motion determiner 132, and the third motion determiner 133 are the same in the motion determination method but different from each other as to the axis about which the feature quantity is obtained. The motion determination process of the second motion determiner 132 is described below.

The determination data acquisition unit 1321 acquires the feature quantities of the Y axis, i.e., the average value AGy, the variance value VAy, and the angle DAy.

The habit of the user who moves the mobile terminal 1 may appear immediately prior to or immediately subsequent to a motion consciously performed by the user. In the discussion that follows, the motion consciously performed by the user is referred to as an intended action. The habit appearing immediately prior to the intended action is referred to as a "pre-action," and the habit appearing immediately subsequent to the intended action is referred to as a "post-action." The pre-action and the post-action may be considered as actions accompanying the intended action.

The pre/post-action feature quantity remover 1322 detects the intended action, the pre-action, and the post-action, and selects only the feature quantity representing the intended action, i.e., removes the pre-action and the post-action. The process of the pre/post-action feature quantity remover 1322 is described later.

As illustrated in FIG. 5, the motion learning database 1323 stores motion feature data 57 for each motion. The motion feature data 57 includes the variance value, the average value, and the angle appearing when the corresponding motion is performed.

The motion searcher 1324 searches the motion learning database 1323 for data including one or more (for example, substantially all or all) the features represented by the feature quantity selected by the pre/post-action feature quantity remover 1322, and determines as a motion performed by the user the motion of the hit data.

The detection method of the intended action, the pre-action, and the post-action is described successively with reference to a flowchart.

Figure 6A:
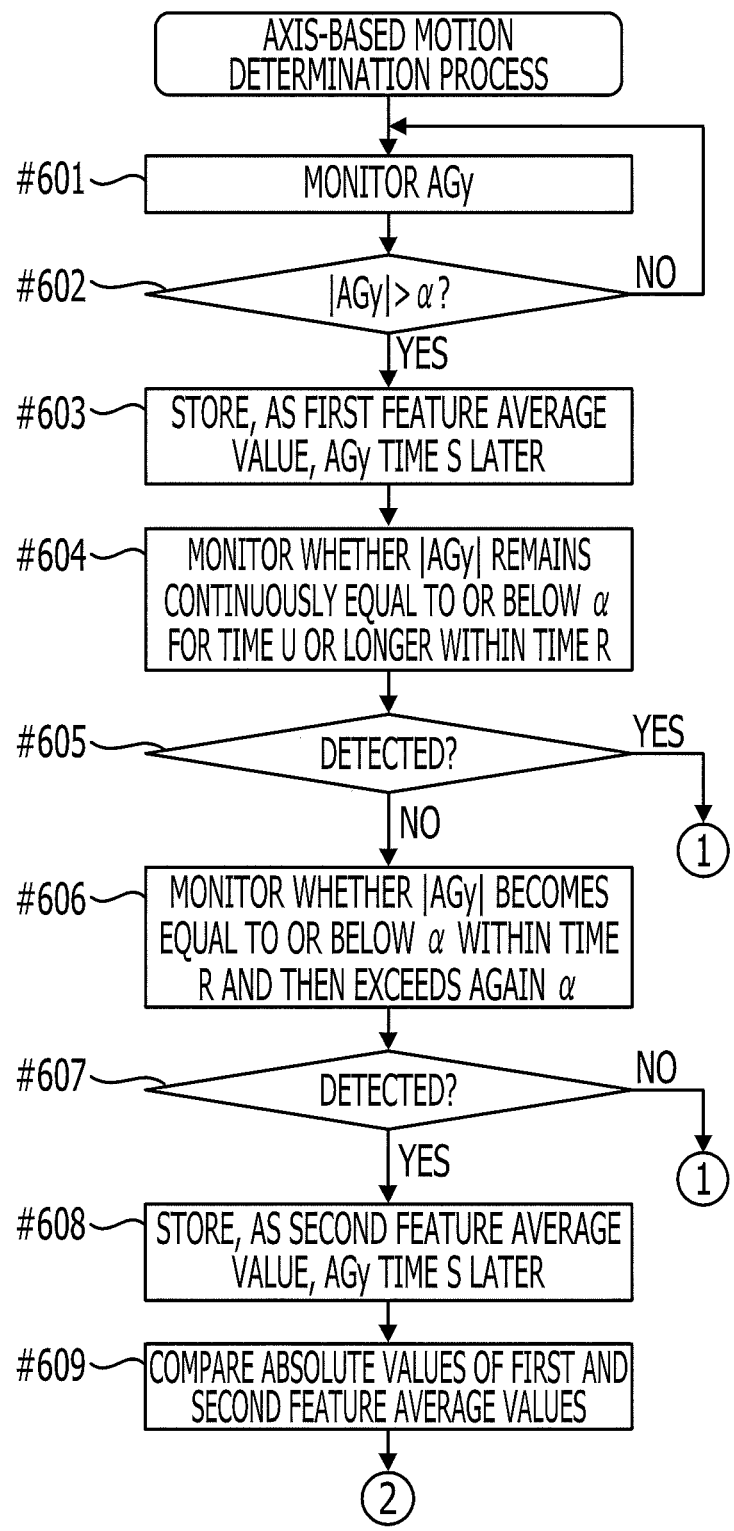

First method of detecting the intended action, the pre-action and the post-action FIGS. 6A and 6B are a flowchart of an axis-based motion determination process. FIGS. 7-10 illustrate a change in the average value AGy. FIG. 11 illustrates an example of a feature quantity of the intended action.

The pre/post-action feature quantity remover 1322 (see FIG. 4) performs a process indicated by #601 of FIG. 6A through #611 of FIG. 6B in response to the feature quantity of the Y axis acquired by the determination data acquisition unit 1321.

The pre/post-action feature quantity remover 1322 monitors whether the absolute value of the average value AGy successively acquired by the determination data acquisition unit 1321 exceeds a threshold value a (#601 of FIG. 6A). The threshold value α is a positive value according to which the mobile terminal 1 is considered to stay still.

If the absolute value of the average value AGy exceeds the threshold value α (yes from #602), the pre/post-action feature quantity remover 1322 selects the average value AGy at time Tb at which a time period S has elapsed since time Ta at which the absolute value of the average value AGy exceeded the threshold value α. The pre/post-action feature quantity remover 1322 then stores the average value AGy as a first feature quantity average value AGy1 (#603). The time period S is a constant time period, and may be 50 milliseconds, for example.

Within a time elapse of the time period R from time Tb, the pre/post-action feature quantity remover 1322 monitors whether a time duration of a state under which the absolute value of the average value AGy remains continuously equal to or below the threshold value α is present and whether the time duration is equal to or longer than time period U (#604). The time period R is a constant time period, and may be 200 milliseconds, for example. The time period U is also a constant time period and may be 100 milliseconds, for example.

Upon detecting that the time duration of the state (state time duration) is equal to or longer than the time period U (yes from #605), the pre/post-action feature quantity remover 1322 selects the first feature quantity average value AGy1 as an intended action feature quantity average value AGyt, i.e., one value representing the feature of the intended action (#611 in FIG. 6B).

If the state time duration equal to or longer than the time period U is not detected (no from #605), the pre/post-action feature quantity remover 1322 monitors whether the absolute value of the average value AGy has become equal to or below the threshold value α and then has exceeded again the threshold value α within the time period R from time Tb (#606).

If the pre/post-action feature quantity remover 1322 has not detected such as a transition of the average value AGy (no from #607), the pre/post-action feature quantity remover 1322 selects the first feature quantity average value AGy1 as the intended action feature quantity average value AGyt (#611 in FIG. 6B).

If the pre/post-action feature quantity remover 1322 has detected such as a transition of the average value AGy (yes from #607), the pre/post-action feature quantity remover 1322 selects the average value AGy at time Td after a time elapse of the time period S from time Tc at which the absolute value of the average value AGy exceeded the threshold value α. The pre/post-action feature quantity remover 1322 then stores the average value AGy as a second feature quantity average value AGy2 (#608).

The pre/post-action feature quantity remover 1322 compares the absolute value of the first feature quantity average value AGy1 with the absolute value of the second feature quantity average value AGy2 (#609), and selects, as the intended action feature quantity average value AGyt, the first feature quantity average value AGy1 or the second feature quantity average value AGy2, whichever is larger in absolute value (#610).

Described below with reference to FIGS. 7-10 is a specific example of the selection process of the pre/post-action feature quantity remover 1322 of selecting the intended action feature quantity average value AGyt.

Figure 7:
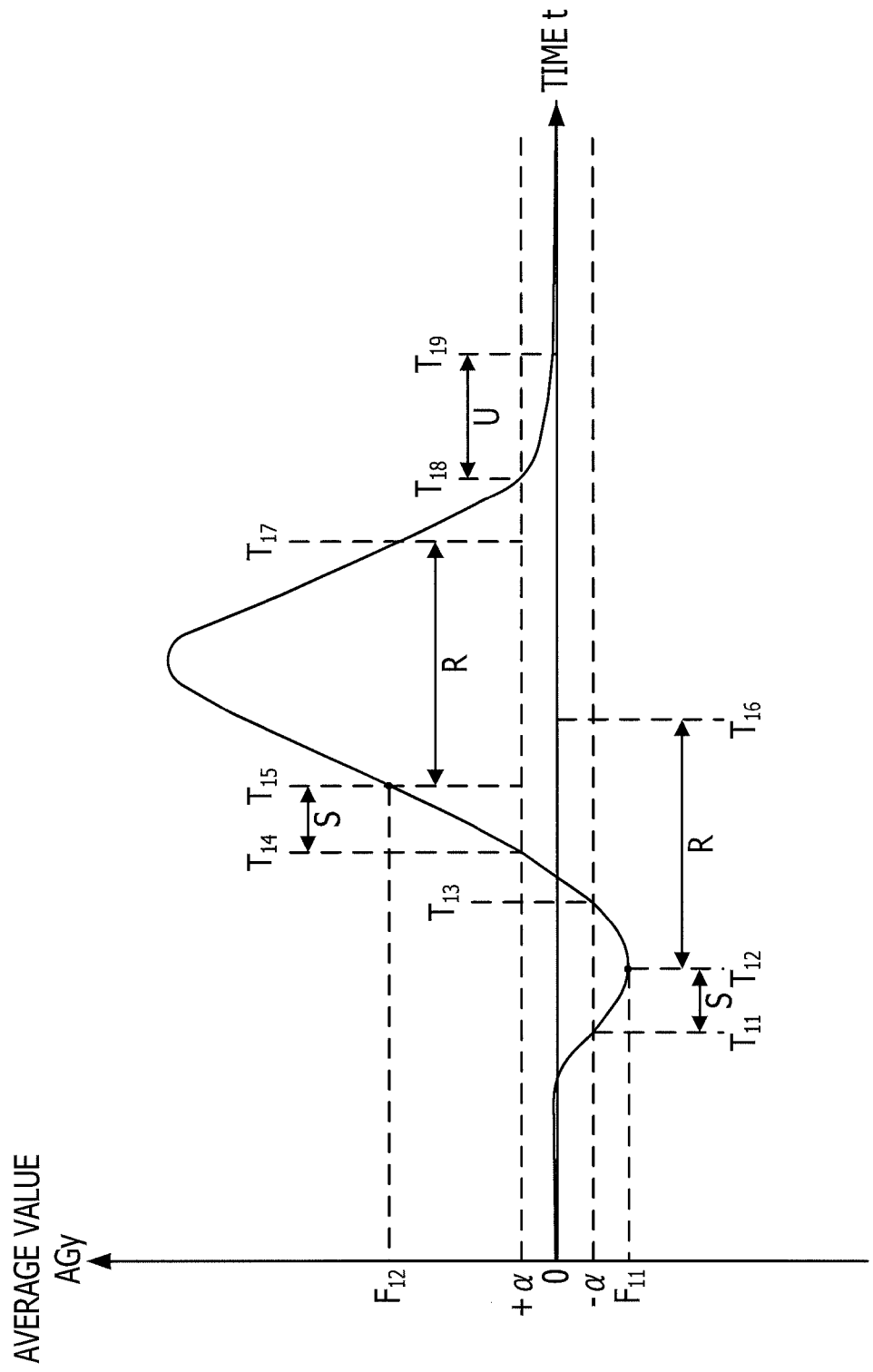
FIG. 7 illustrates a change in an average value AGy.

If the average value AGy transitions as illustrated in FIG. 7, the pre/post-action feature quantity remover 1322 selects the intended action feature quantity average value AGyt as described below.

The pre/post-action feature quantity remover 1322 detects at time T11 that the absolute value of the average value AGy exceeds the threshold value α (yes from #602 in FIG. 6A). Time T11 corresponds to the above-described time Ta.

The pre/post-action feature quantity remover 1322 selects the average value AGy (value F11) at time T12 after a time elapse of time period S from time T11, and stores the average value AGy as the first feature quantity average value AGy1 (#603). Time T12 corresponds to the above-described time Tb.

Within the time period R continuous from time T12 (from time T12 to time T16), a time duration throughout which the absolute value of the average value AGy remains equal to or below the threshold value α is present. This time duration continues from time T13 to time T14. Since the time duration is shorter than the time period U, the pre/post-action feature quantity remover 1322 does not detect the time duration (no from #605).

Within the time period R continuous from time T12, the absolute value of the average value AGy becomes equal to or below the threshold value α and then rises again above the threshold value a at time T14. The pre/post-action feature quantity remover 1322 detects this transition (yes from #607). Time T14 corresponds to the above-described time Tc.

The pre/post-action feature quantity remover 1322 selects the average value AGy (value F12) at time T15 after a time elapse of the time period S from time T14, and stores the average value AGy as the second feature quantity average value AGy2 (#608).

The pre/post-action feature quantity remover 1322 compares the absolute value of the first feature quantity average value AGy1 with the absolute value of the second feature quantity average value AGy2 (#609). Referring to FIG. 7, the absolute value of the second feature quantity average value AGy2 is larger than the absolute value of the first feature quantity average value AGy1. The pre/post-action feature quantity remover 1322 thus selects the second feature quantity average value AGy2 as the intended action feature quantity average value AGyt (#610 in FIG. 6B). The first feature quantity average value AGy1 may be considered as representing the feature of the pre-action.

Figure 8:
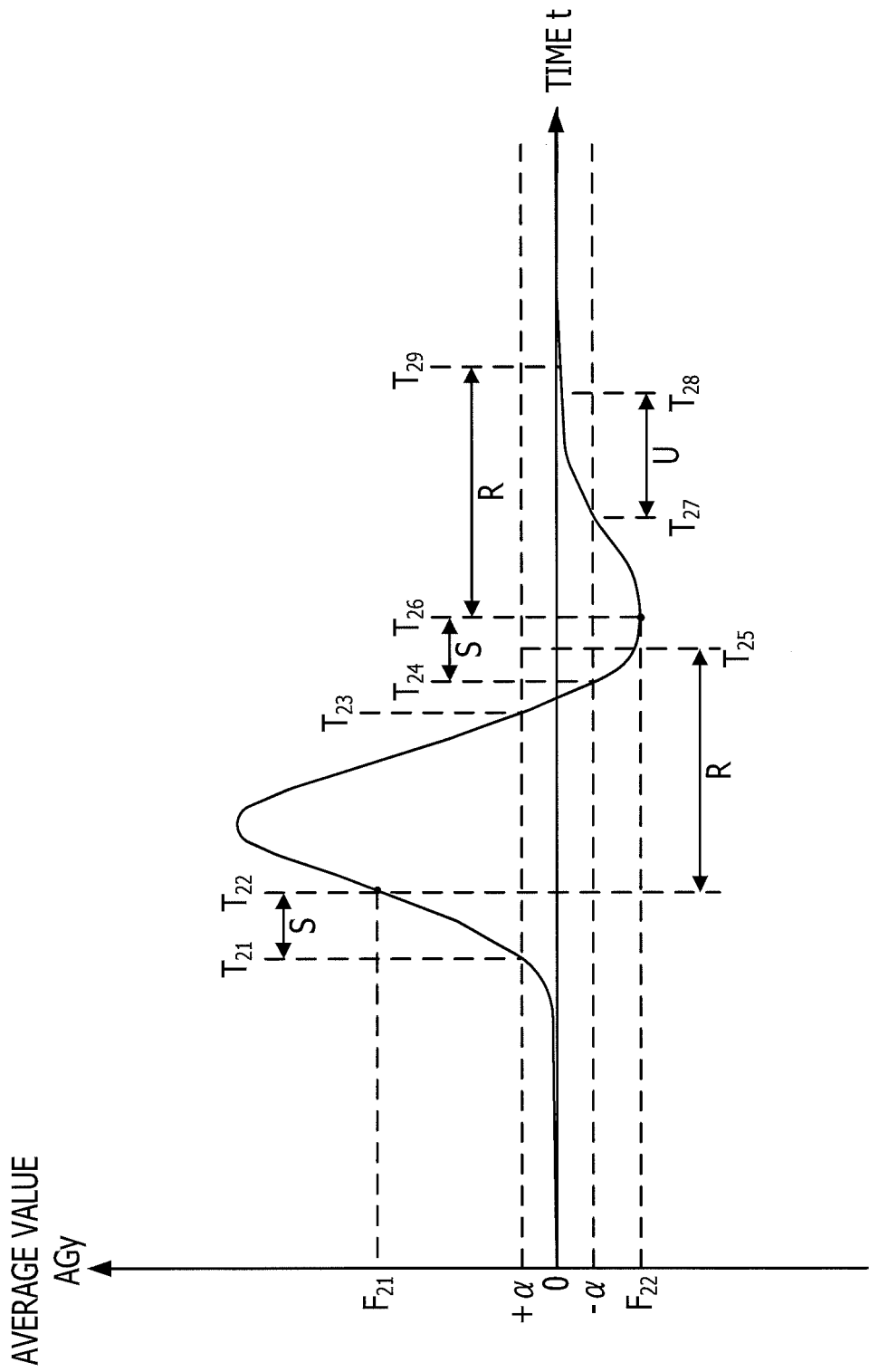
FIG. 8 illustrates a change in the average value AGy.

If the average value AGy transitions as illustrated in FIG. 8, the pre/post-action feature quantity remover 1322 selects the intended action feature quantity average value AGyt as described below.

The pre/post-action feature quantity remover 1322 detects at time T21 that the absolute value of the average value AGy has risen above the threshold value α (yes from #602 in FIG. 6B). Time T21 corresponds to the above-described time Ta.

The pre/post-action feature quantity remover 1322 selects the average value AGy (value F21) at time T22 after a time elapse of the time period S from time T21, and then stores the average value AGy as the first feature quantity average value AGy1 (#603). Time T22 corresponds to the above-described time Tb.

Within the time period R continuous from time T22 (from time T22 to time T25), a time duration throughout which the absolute value of the average value AGy remains equal to or below the threshold value α is present. This time duration continues from time T23 to time T24. Since the time duration is shorter than the time period U, the pre/post-action feature quantity remover 1322 does not detect the time duration (no from #605).

Within the time period R continuous from time T22, the absolute value of the average value AGy becomes equal to or below the threshold value α and then rises again above the threshold value α at time T24. The pre/post-action feature quantity remover 1322 thus detects this transition (yes from #607). Time T24 corresponds to the above-described time Tc.

The pre/post-action feature quantity remover 1322 selects the average value AGy (value F22) at time T26 after a time elapse of the time period S from time T24, and then stores the average value AGy as the second feature quantity average value AGy2 (#608).

The pre/post-action feature quantity remover 1322 compares the absolute value of the first feature quantity average value AGy1 with the absolute value of the second feature quantity average value AGy2 (#609). Referring to FIG. 8, the absolute value of the first feature quantity average value AGy1 is larger than the absolute value of the second feature quantity average value AGy2. The pre/post-action feature quantity remover 1322 thus selects the first feature quantity average value AGy1 as the intended action feature quantity average value AGyt (#610 in FIG. 6B). The second feature quantity average value AGy2 is considered as representing the feature of the post-action.

Figure 9:
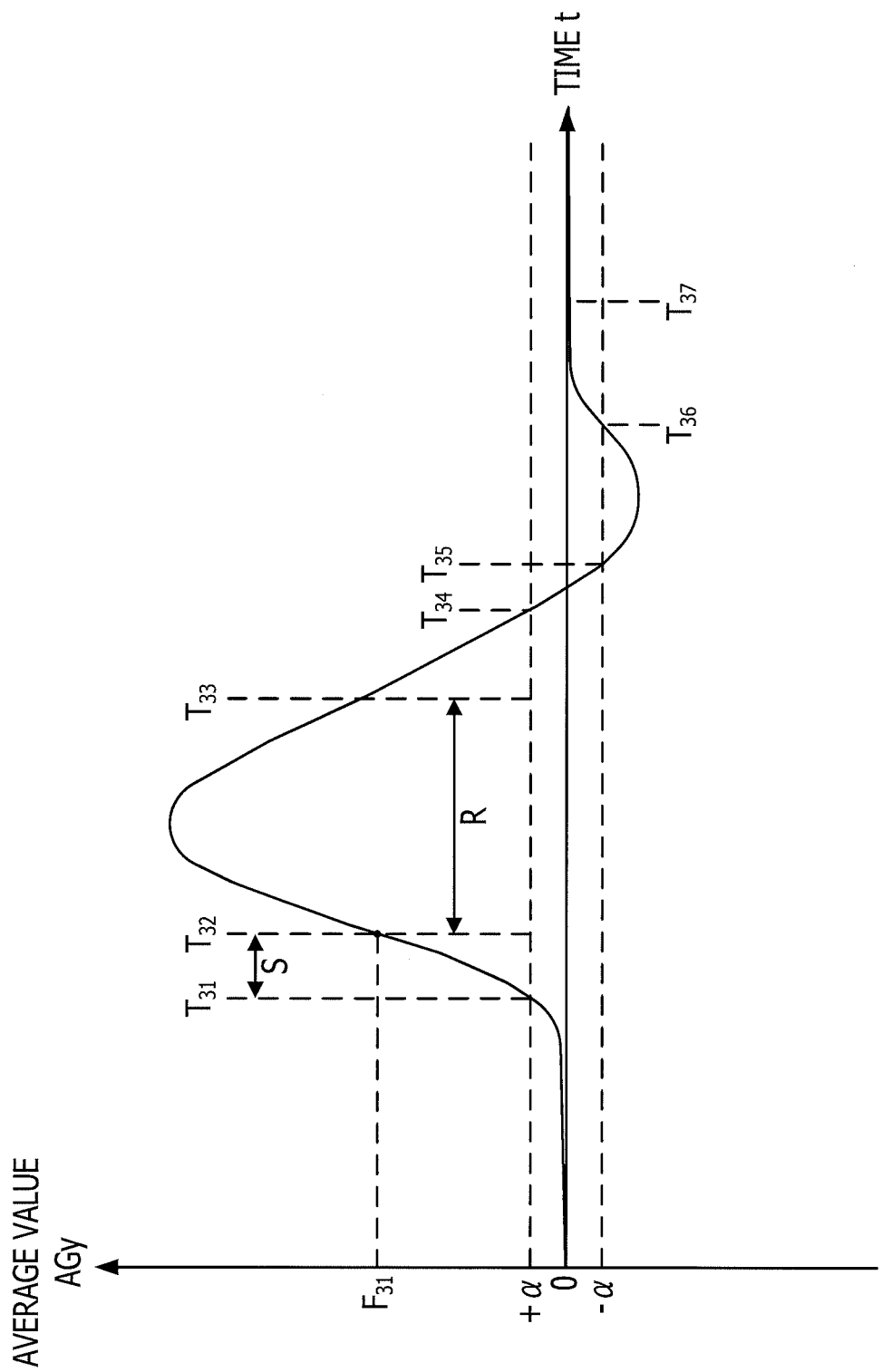
FIG. 9 illustrates a change in the average value AGy.

If the average value AGy transitions as illustrated in FIG. 9, the pre/post-action feature quantity remover 1322 selects the intended action feature quantity average value AGyt as described below.

The pre/post-action feature quantity remover 1322 detects at time T31 that the absolute value of the average value AGy has risen above the threshold value a (yes from #602 in FIG. 6A). Time T31 corresponds to the above-described time Ta.

The pre/post-action feature quantity remover 1322 selects the average value AGy (value F31) at time T32 after a time elapse of the time period S from time T31, and then stores the average value AGy as the first feature quantity average value AGy1 (#603). Time T32 corresponds to the above-described time Tb.

Within the time period R continuous from time T32 (from time T32 to time T33), a time duration throughout which the absolute value of the average value AGy remains equal to or below the threshold value α is not present. The pre/post-action feature quantity remover 1322 does not detect the time duration (no from #605).

Within the time period R continuous from time T32, the absolute value of the average value AGy does not become equal to or below the threshold value α. The pre/post-action feature quantity remover 1322 does not detect the transition that the absolute value of the average value AGy becomes equal to or below the threshold value α (no from #607).

The pre/post-action feature quantity remover 1322 selects the first feature quantity average value AGy1 as the intended action feature quantity average value AGyt (#611 in FIG. 6B).

Figure 10:
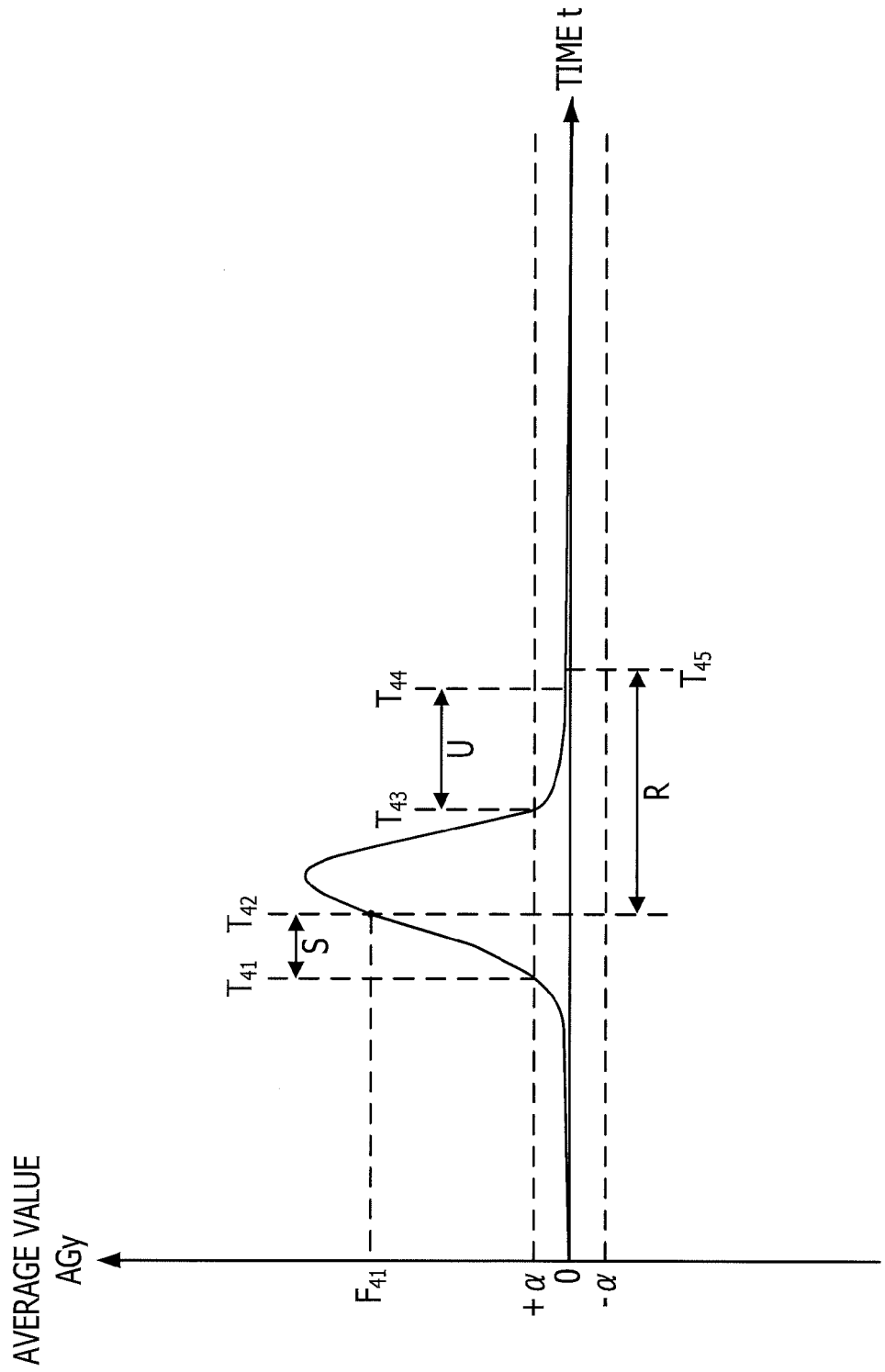
FIG. 10 illustrates a change in the average value AGy.

If the average value AGy transitions as illustrated in FIG. 10, the pre/post-action feature quantity remover 1322 selects the intended action feature quantity average value AGyt as described below.

The pre/post-action feature quantity remover 1322 detects at time T41 that the absolute value of the average value AGy has risen above the threshold value α (yes from #602 in FIG. 6A). Time T41 corresponds to the above-described time Ta.

The pre/post-action feature quantity remover 1322 selects the average value AGy (value F41) at time T32 after a time elapse of the time period S from time T41, and then stores the average value AGy as the first feature quantity average value AGy1 (#603). Time T32 corresponds to the above-described time Tb.

Within the time period R continuous from time T42 (from time T42 to time T45), a time duration throughout which the absolute value of the average value AGy remains equal to or below the threshold value α is present. This time duration continues from time T43 to time T44. The time duration is equal to or longer than the time period U. The pre/post-action feature quantity remover 1322 detects the time duration (yes from #605).

The pre/post-action feature quantity remover 1322 selects the first feature quantity average value AGy1 as the intended action feature quantity average value AGyt (#611 in FIG. 6B).

In the examples of FIGS. 9 and 10, only the feature of the intended action is thus detected, and neither the feature of the pre-action nor the feature of the post-action is detected.

The pre/post-action feature quantity remover 1322 not only selects the intended action feature quantity average value AGyt but also identifies the time duration of the intended action. For example, a duration of time from when the absolute value of the average value AGy exceeds the threshold value α immediately prior to the appearance of the intended action feature quantity average value AGyt to when the absolute value of the average value AGy becomes equal to or below the threshold value α may be set to be the time duration of the intended action. Referring to FIG. 7, the time duration from time T14 to time T18 is the time duration of the intended action.

Returning to the discussion of the flowchart, the motion searcher 1324 of FIG. 4 searches the motion learning database 1323 for data representing, for example, all the features (see FIG. 11) such as the variance value VAy and the angle DAy in the time duration of the intended action in addition to the intended action feature quantity average value AGyt selected by the pre/post-action feature quantity remover 1322. In one embodiment, the variance value VAy and the angle DAy used may be those close in time to the intended action feature quantity average value AGyt. The motion searcher 1324 determines a motion related to the hit data as a motion performed by the user (#612).

After storing the first feature quantity average value AGy1, the second motion determiner 132 does not detect a next motion until the absolute value of the average value AGy settles to be equal to or below the threshold value α for the time period U or longer (no from #614 and #613).

As the second motion determiner 132, the first motion determiner 131 and the third motion determiner 133 identify the intended action based on the feature quantity of the X axis and the feature quantity of the Z axis, and determine the motion.

In one embodiment, three or more average values AGy may be selected including the first feature quantity average value AGy1 and the second feature quantity average value AGy2, in order to determine the intended action, the pre-action, and the post-action.

Figure 12A:
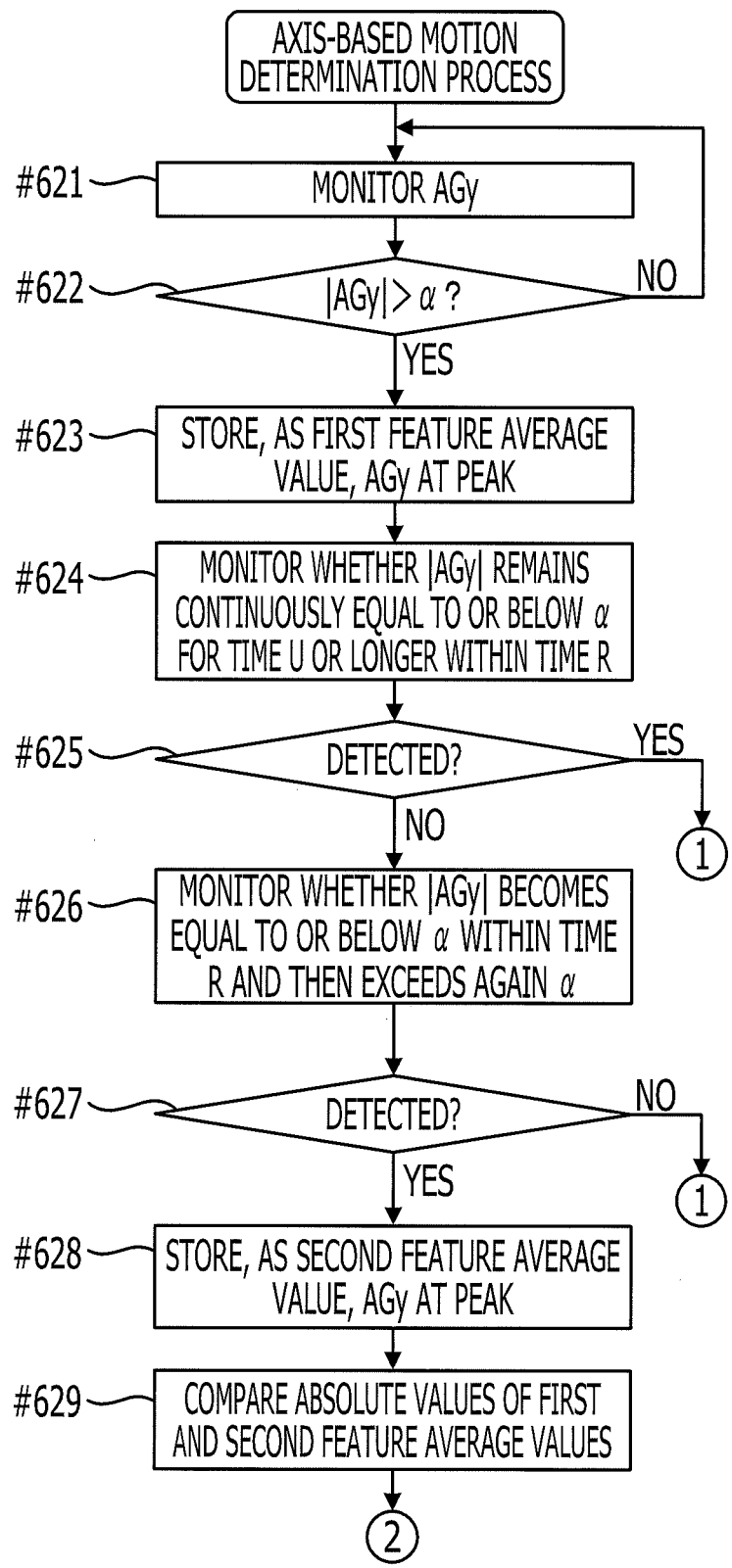
FIGS. 12A and 12B are a flowchart illustrating an example of the process flow of an axis-based motion determination process.
Figure 12B:
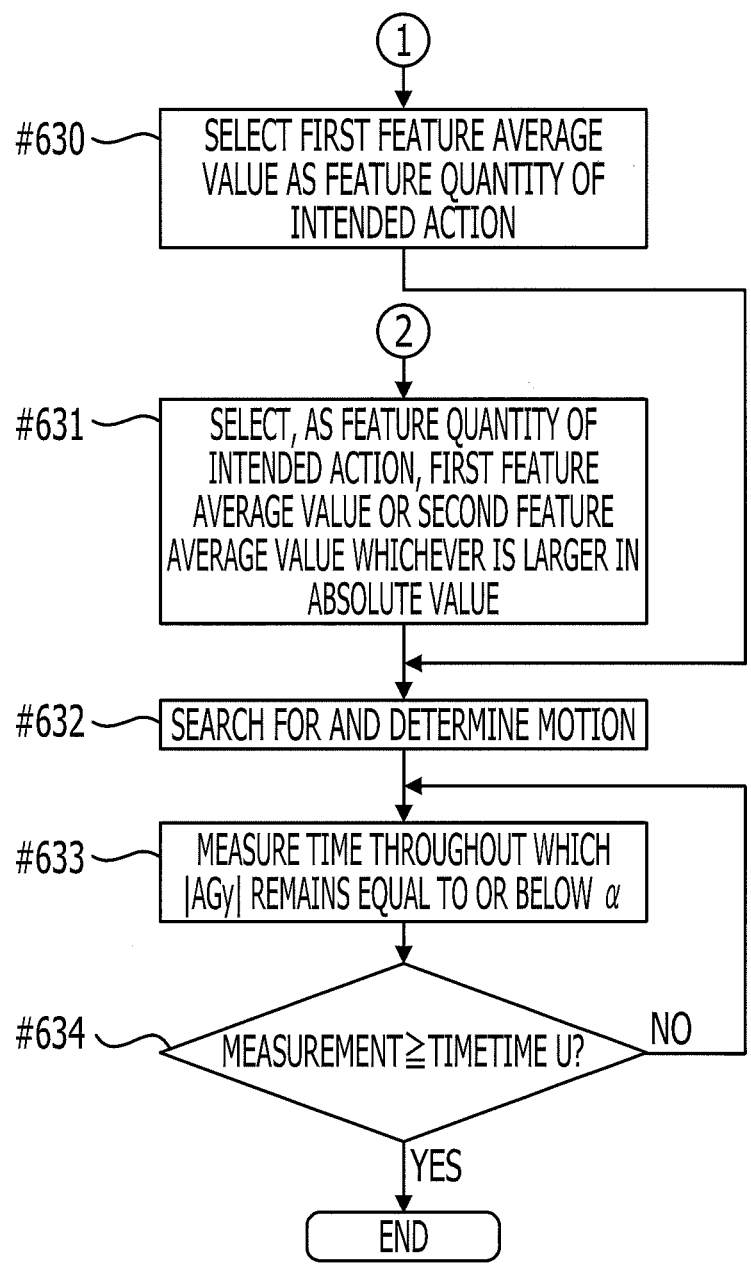

Second method of detecting the intended action, the pre-action and the post-action FIGS. 12A and 12B are a flowchart illustrating a process flow of an axis-based motion determination process, and FIGS. 13-16 illustrate a change in the average value AGy.

According to the first method, the pre/post-action feature quantity remover 1322 selects, as one of the first feature quantity average value AGy1 and the second feature quantity average value AGy2, the average value AGy at the time (for example, time T12 and time T15 in FIG. 7) after a time elapse of the time period S from the time when the absolute value of the average value AGy exceeds the threshold value α (for example, time T11 and time T14 in FIG. 7).

According to the second method, the pre/post-action feature quantity remover 1322 selects, as one of the first feature quantity average value AGy1 and the second feature quantity average value AGy2, the average value AGy at a plus peak or a minus peak immediately subsequent to the time when the absolute value of the average value AGy exceeds the threshold value α. The process of the pre/post-action feature quantity remover 1322 according to the second method is described with reference to a flowchart of FIGS. 12A and 12B. Operations identical to those of the first method are omitted.

The pre/post-action feature quantity remover 1322 performs operations #621 in FIG. 12A to #631 in FIG. 12B based on the feature quantity of the Y axis acquired by the determination data acquisition unit 1321.

As in the first method, the pre/post-action feature quantity remover 1322 monitors whether the absolute value of the average value AGy successively acquired by the determination data acquisition unit 1321 exceeds the threshold value α (#621 in FIG. 12A).

If the absolute value of the average value AGy exceeded the threshold value α (yes from #622), the pre/post-action feature quantity remover 1322 selects the average value AGy as a plus peak or a minus peak immediately subsequent to time Ka when the absolute value of the average value AGy exceeded the threshold value α, and stores the average value AGy as the first feature quantity average value AGy1 (#623).

Within the time period R continuous from time Kb at the appearance of the first feature quantity average value AGy1, the pre/post-action feature quantity remover 1322 monitors whether a time duration throughout which the absolute value of the average value AGy remains equal to or below the threshold value α is present and whether the time duration is equal to or longer than the time period U (#624).

If the pre/post-action feature quantity remover 1322 detects the time duration equal to or longer than the time period U (yes from #625), the pre/post-action feature quantity remover 1322 selects the first feature quantity average value AGy1 as the intended action feature quantity average value AGyt as in the first method (#631 in FIG. 12B).

If the pre/post-action feature quantity remover 1322 does not detect the time period equal to or longer than the time period U (no from #625), the pre/post-action feature quantity remover 1322 monitors whether the absolute value of the average value AGy becomes equal to or below the threshold value α and then rises again above the threshold value α within a time elapse of the time period R from time Kb (#626).

If the pre/post-action feature quantity remover 1322 does not detect that the average value AGy transitioned in such a way, the pre/post-action feature quantity remover 1322 selects the first feature quantity average value AGy1 as the intended action feature quantity average value AGyt (#631 in FIG. 12B).

If the pre/post-action feature quantity remover 1322 detects that the average value AGy transitioned in such a way (yes from #627), the pre/post-action feature quantity remover 1322 selects the average value AGy at a plus peak or a minus peak immediately subsequent to time Kc when the absolute value of the average value AGy exceeded again the threshold value α. The pre/post-action feature quantity remover 1322 stores the average value AGy as the second feature quantity average value AGy2 (#628).

The pre/post-action feature quantity remover 1322 compares the absolute value of the first feature quantity average value AGy1 with the absolute value of the second feature quantity average value AGy2 (#629), and selects, as the intended action feature quantity average value AGyt, the first feature quantity average value AGy1 or the second feature quantity average value AGy2, whichever is larger in absolute value (#630).

Discussed referring to FIGS. 13-16 is a specific example of the selection process of the pre/post-action feature quantity remover 1322 of selecting the intended action feature quantity average value AGyt in accordance with the second method.

Figure 13:
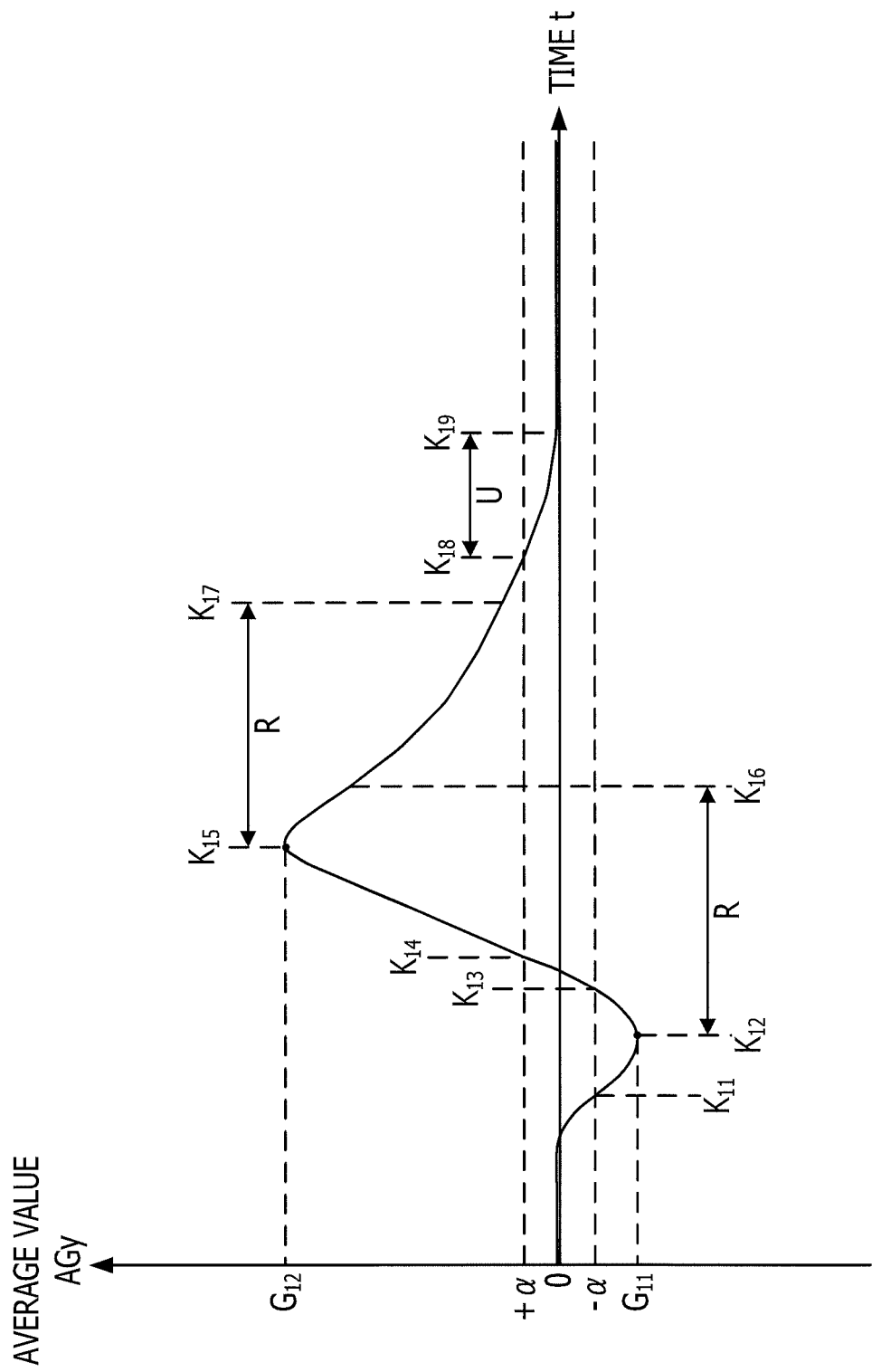
FIG. 13 illustrates a change in the average value AGy.

If the average value AGy transitions as illustrated in FIG. 13, the pre/post-action feature quantity remover 1322 selects the intended action feature quantity average value AGyt as described below.

The pre/post-action feature quantity remover 1322 detects that the absolute value of the average value AGy exceeded the threshold value α at time K11 (yes from #622 in FIG. 12A). Time K11 corresponds to the above-described time Ka.

The pre/post-action feature quantity remover 1322 selects the average value AGy at a plus peak or a minus peak immediately subsequent to time K11, i.e., the average value AGy (value G11) at time K12, and stores the average value AGy as the first feature quantity average value AGy1 (#623). Time K12 corresponds to the above-described time Kb.

Within the time period R continuous from time K12 (from time K12 to time K16), a time duration throughout which the absolute value of the average value AGy remains equal to or below the threshold value α is present. This time duration continues from time K13 to time K14. Since the time duration is shorter than the time period U, the pre/post-action feature quantity remover 1322 does not detect the time duration (no from #625).

Within the time period R continuous from time K12, the absolute value of the average value AGy becomes equal to or below the threshold value α and then rises again above the threshold value α at time K14. The pre/post-action feature quantity remover 1322 thus detects this transition (yes from #627). Time K14 corresponds to the above-described time Kc.

The pre/post-action feature quantity remover 1322 selects the average value AGy at a plus peak or a minus peak immediately subsequent to time K14, i.e., the average value AGy (value G12) at time K15, and then stores the average value AGy as the second feature quantity average value AGy2 (#628).

As in the first method, the pre/post-action feature quantity remover 1322 compares the absolute value of the first feature quantity average value AGy1 with the absolute value of the second feature quantity average value AGy2 (#629). Referring to FIG. 13, the absolute value of the second feature quantity average value AGy2 is larger than the absolute value of the first feature quantity average value AGy1. The pre/post-action feature quantity remover 1322 thus selects the second feature quantity average value AGy2 as the intended action feature quantity average value AGyt (#630 in FIG. 12B).

Figure 14:
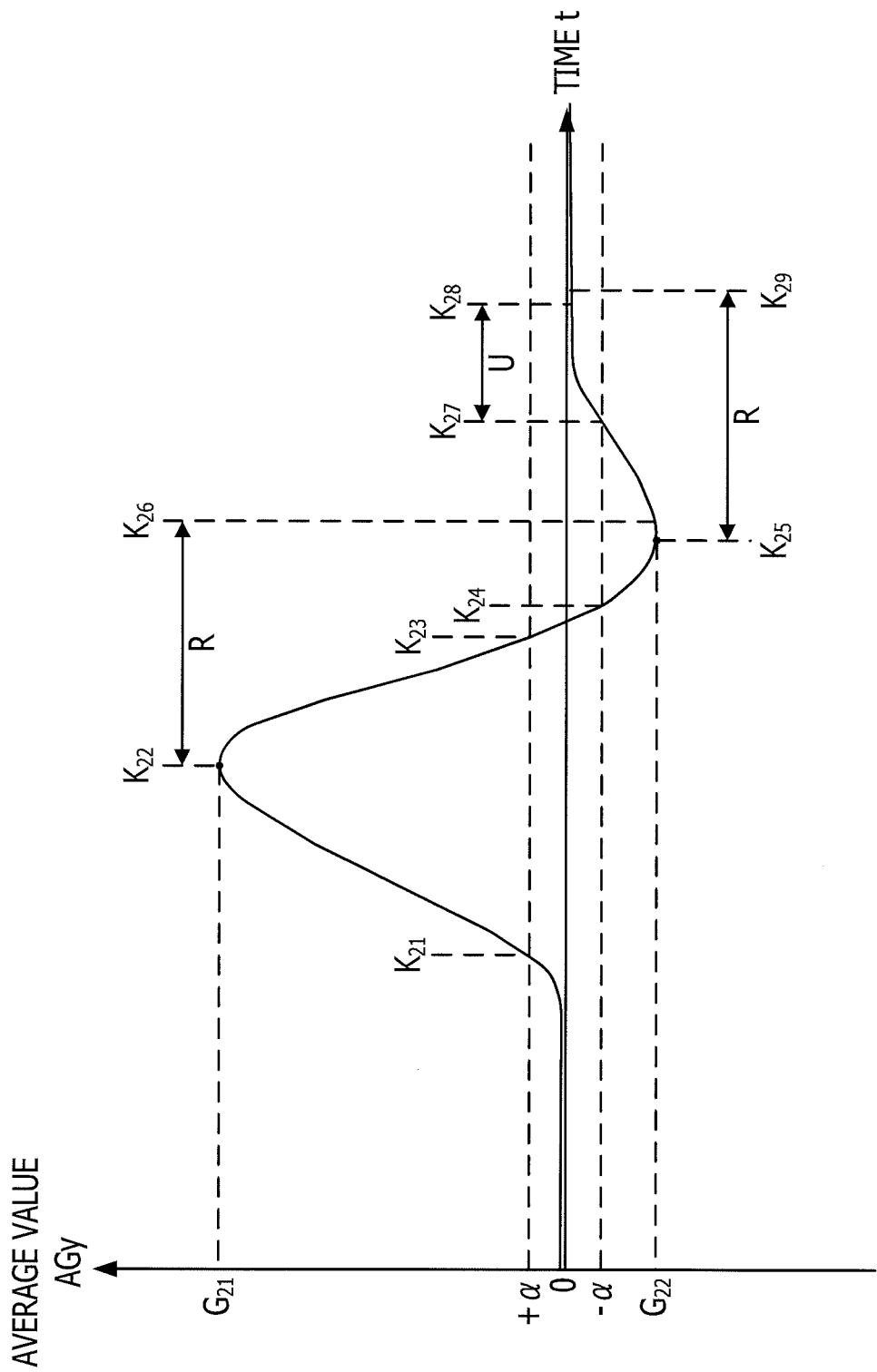
FIG. 14 illustrates a change in the average value AGy.

If the average value AGy transitions as illustrated in FIG. 14, the pre/post-action feature quantity remover 1322 selects the intended action feature quantity average value AGyt as described below.

The pre/post-action feature quantity remover 1322 detects that the absolute value of the average value AGy rose above the threshold value α at time K21 (yes from #622 in FIG. 12A). Time K21 corresponds to the above-described time Ka.

The pre/post-action feature quantity remover 1322 selects the average value AGy at a plus peak or a minus peak immediately subsequent to time K21, i.e., the average value AGy (value G21) at time K22, and then stores the average value AGy as the second feature quantity average value AGy2 (#623). Time K22 corresponds to the above-described time Kb.

Within the time period R continuous from time K22 (from time K22 to time K26), a time duration throughout which the absolute value of the average value AGy remains equal to or below the threshold value α is present. This time duration continues from time K23 to time K24. Since the time duration is shorter than the time period U, the pre/post-action feature quantity remover 1322 does not detect the time duration (no from #625).

Within the time period R continuous from time K22, the absolute value of the average value AGy becomes equal to or below the threshold value α at time K23 and then rises again above the threshold value α at time K24. The pre/post-action feature quantity remover 1322 thus detects this transition (yes from #627). Time K24 corresponds to the above-described time Kc.

The pre/post-action feature quantity remover 1322 selects the average value AGy at a plus peak or a minus peak immediately subsequent to time K24, i.e., the average value AGy (value G22) at time K25, and then stores the average value AGy as the second feature quantity average value AGy2 (#628).

As in the first method, the pre/post-action feature quantity remover 1322 compares the absolute value of the first feature quantity average value AGy1 with the absolute value of the second feature quantity average value AGy2 (#629). Referring to FIG. 14, the absolute value of the first feature quantity average value AGy1 is larger than the absolute value of the second feature quantity average value AGy2. The pre/post-action feature quantity remover 1322 thus selects the first feature quantity average value AGy1 as the intended action feature quantity average value AGyt (#630 in FIG. 12B).

Figure 15:
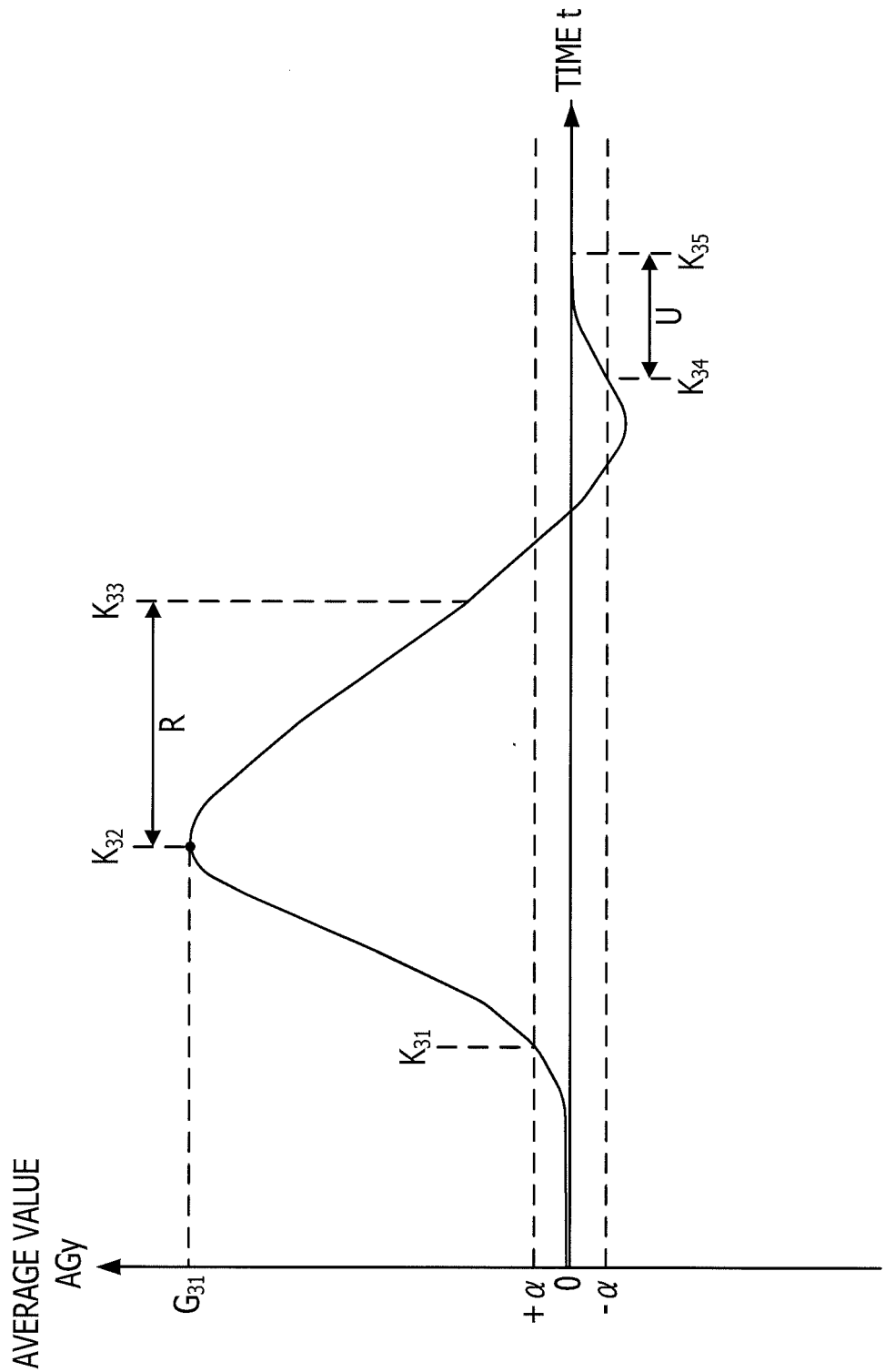
FIG. 15 illustrates a change in the average value AGy.

If the average value AGy transitions as illustrated in FIG. 15, the pre/post-action feature quantity remover 1322 selects the intended action feature quantity average value AGyt as described below.

The pre/post-action feature quantity remover 1322 detects that the absolute value of the average value AGy rose above the threshold value α at time K31 (yes from #622 in FIG. 12A). Time K31 corresponds to the above-described time Ka.

The pre/post-action feature quantity remover 1322 selects the average value AGy at a plus peak or a minus peak immediately subsequent to time K31, i.e., the average value AGy (value G31) at time K32, and then stores the average value AGy as the second feature quantity average value AGy2 (#623). Time K32 corresponds to the above-described Kb.

Within the time period R continuous from time K32 (from time K32 to time K33), a time duration throughout which the absolute value of the average value AGy remains equal to or below the threshold value α is not present. The pre/post-action feature quantity remover 1322 does not detect the time duration (no from #625).

Within the time period R continuous from time K32, the absolute value of the average value AGy does not become equal to or below the threshold value α. The pre/post-action feature quantity remover 1322 does not detect the transition that the absolute value of the average value AGy becomes equal to or below the threshold value α and then exceeds the threshold value α again (no from #627).

The pre/post-action feature quantity remover 1322 selects the first feature quantity average value AGy1 as the intended action feature quantity average value AGyt (#631 in FIG. 12B).

Figure 16:
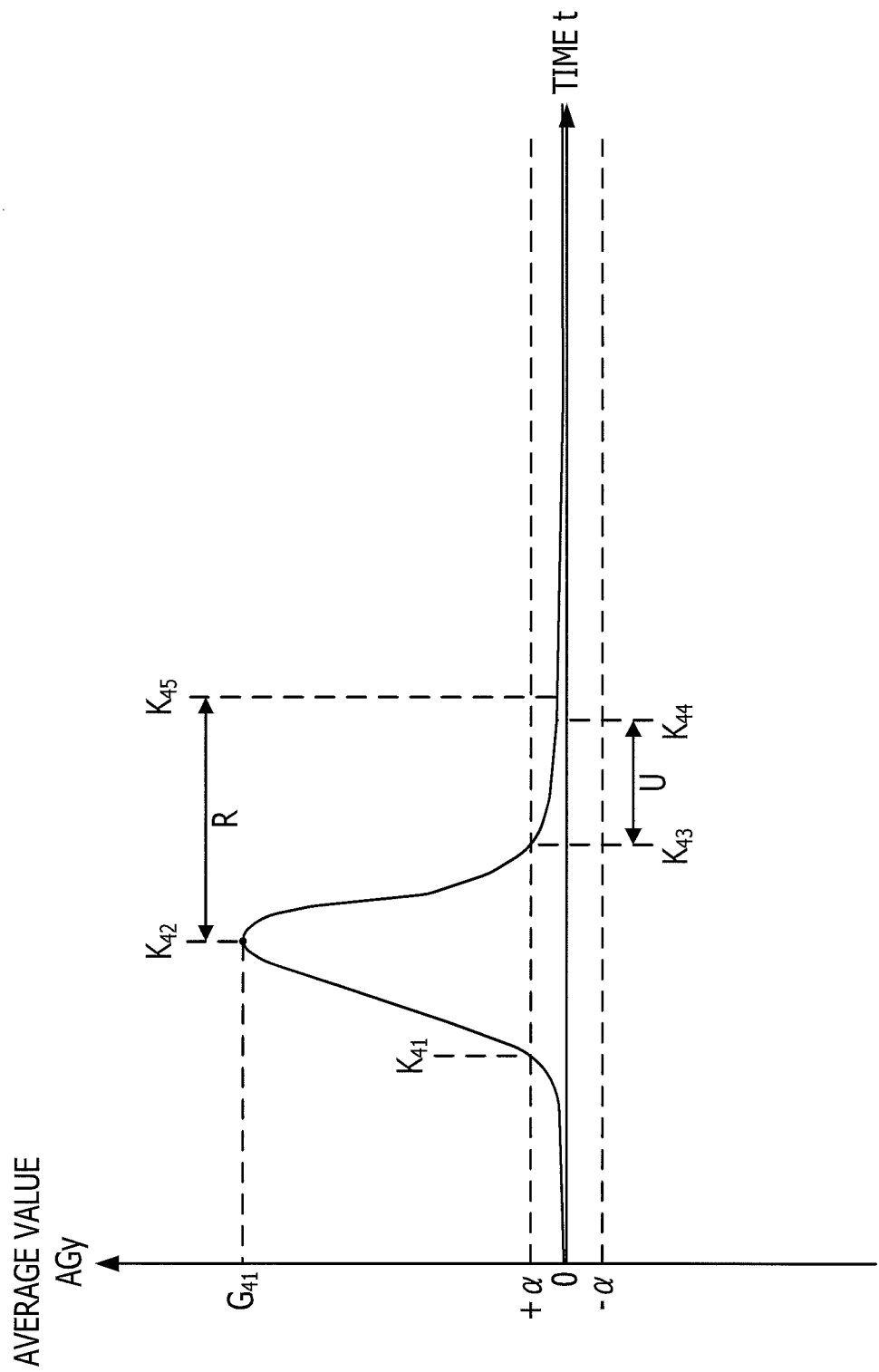
FIG. 16 illustrates a change in the average value AGy.

If the average value AGy transitions as illustrated in FIG. 16, the pre/post-action feature quantity remover 1322 selects the intended action feature quantity average value AGyt as described below.

The pre/post-action feature quantity remover 1322 detects that the absolute value of the average value AGy rose above the threshold value α at time T41(yes from #622 in FIG. 12A). Time K41 corresponds to the above-described time Ka.

The pre/post-action feature quantity remover 1322 selects the average value AGy at a plus peak or a minus peak immediately subsequent to time K41, i.e., the average value AGy (value G41) at time K42, and then stores the average value AGy as the first feature quantity average value AGy1 (#623). Time K42 corresponds to the above-described Kb.

Within the time period R continuous from time K42 (from time K42 to time K45), a time duration throughout which the absolute value of the average value AGy remains equal to or below the threshold value α is present. This time duration continues from time K43 to time K44. The time duration is longer than the time period U. The pre/post-action feature quantity remover 1322 detects the time duration (yes from #625).

The pre/post-action feature quantity remover 1322 selects the first feature quantity average value AGy1 as the intended action feature quantity average value AGyt (#631 in FIG. 12B).

Operation #632 and subsequent operations in FIG. 12B remain identical to operation #612 and subsequent operations, respectively. According to the second method, as the second motion determiner 132, the first motion determiner 131 and the third motion determiner 133 identify the intended action based on the feature quantity of the X axis and the feature quantity of the Z axis, respectively, and determine the motion.

If a motion of a plurality of axes is determined using the first method and/or the second method, the mobile terminal 1 finalizes the motion using a decision tree technique of related art and notifies an application or a service of the finalized motion.

Modification of the First Method and the Second Method

Figure 17:
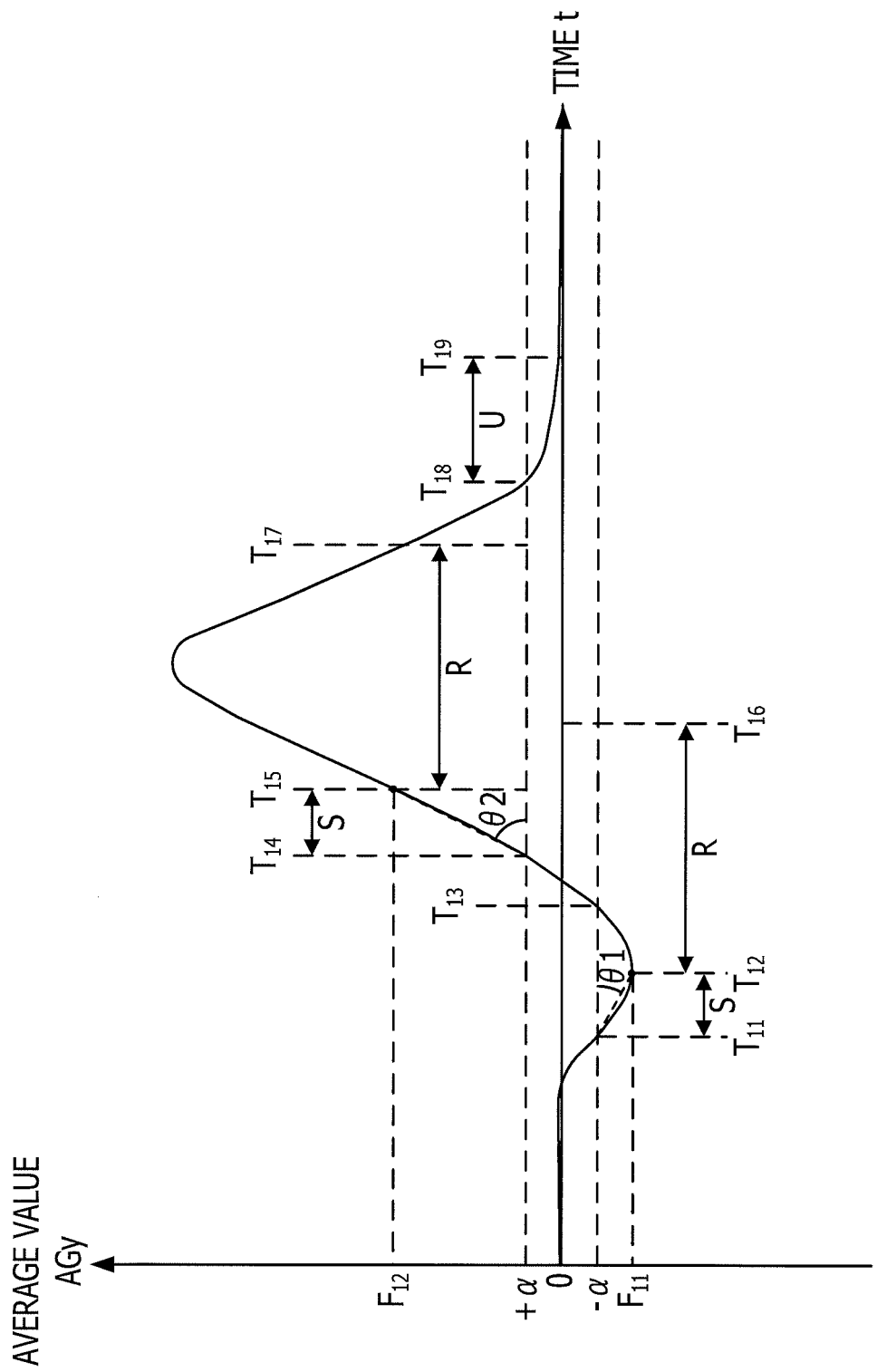
FIG. 17 illustrates an example of angles $\theta 1$ and $\theta 2$.

FIG. 17 illustrates an example of angles θ1 and θ2.

As described with reference to operation #610 of FIG. 6B in the first method, the pre/post-action feature quantity remover 1322 selects, as the intended action feature quantity average value AGyt, the first feature quantity average value AGy1 or the second feature quantity average value AGy2, whichever is larger in absolute value. The following selection method may also be acceptable.

Subsequent to operation #603 of FIG. 6A, the pre/post-action feature quantity remover 1322 calculates the absolute value of a rate of change in the average value AGy from when the absolute value of the average value AGy rises above the threshold value α to when the first feature quantity average value AGy1 is calculated. For example, if the average value AGy changes as illustrated in FIG. 7, the pre/post-action feature quantity remover 1322 calculates the absolute value of the rate of change in the average value AGy from time T11 to time T12.

As the absolute value of the rate of change becomes larger, the angle θ1 (acute angle) between a line connecting the average value AGy at time T11 to the average value AGy at time T12 and the zero axis becomes larger. Referring to FIG. 17, the angle θ1 is calculated in place of the absolute value of the rate of change.

Subsequent to operation #608 of FIG. 6A, the pre/post-action feature quantity remover 1322 calculates an angle θ2. The angle θ2 represents the absolute value of a rate of change in the average value AGy from when the absolute value of the average value AGy rises above the threshold value α to when the second feature quantity average value AGy2 is calculated.

The pre/post-action feature quantity remover 1322 compares the angle θ1 with the angle θ2 in operation #609 rather than comparing the first feature quantity average value AGy1 with the second feature quantity average value AGy2. If the angle θ1 is larger in operation #610, the second motion determiner 132 selects the first feature quantity average value AGy1 as the intended action feature quantity average value AGyt. If the angle θ2 is larger in operation #610, the second motion determiner 132 selects the second feature quantity average value AGy2 as the intended action feature quantity average value AGyt.

In the example of FIG. 8, the pre/post-action feature quantity remover 1322 also compares the angle θ1 with the angle θ2 to select the intended action feature quantity average value AGyt.

In the second method, the pre/post-action feature quantity remover 1322 compares the angle θ1 with the angle θ2 rather than comparing the first feature quantity average value AGy1 with the second feature quantity average value AGy2 in order to select the intended action feature quantity average value AGyt.

Modification of Monitoring Time

Figure 18:
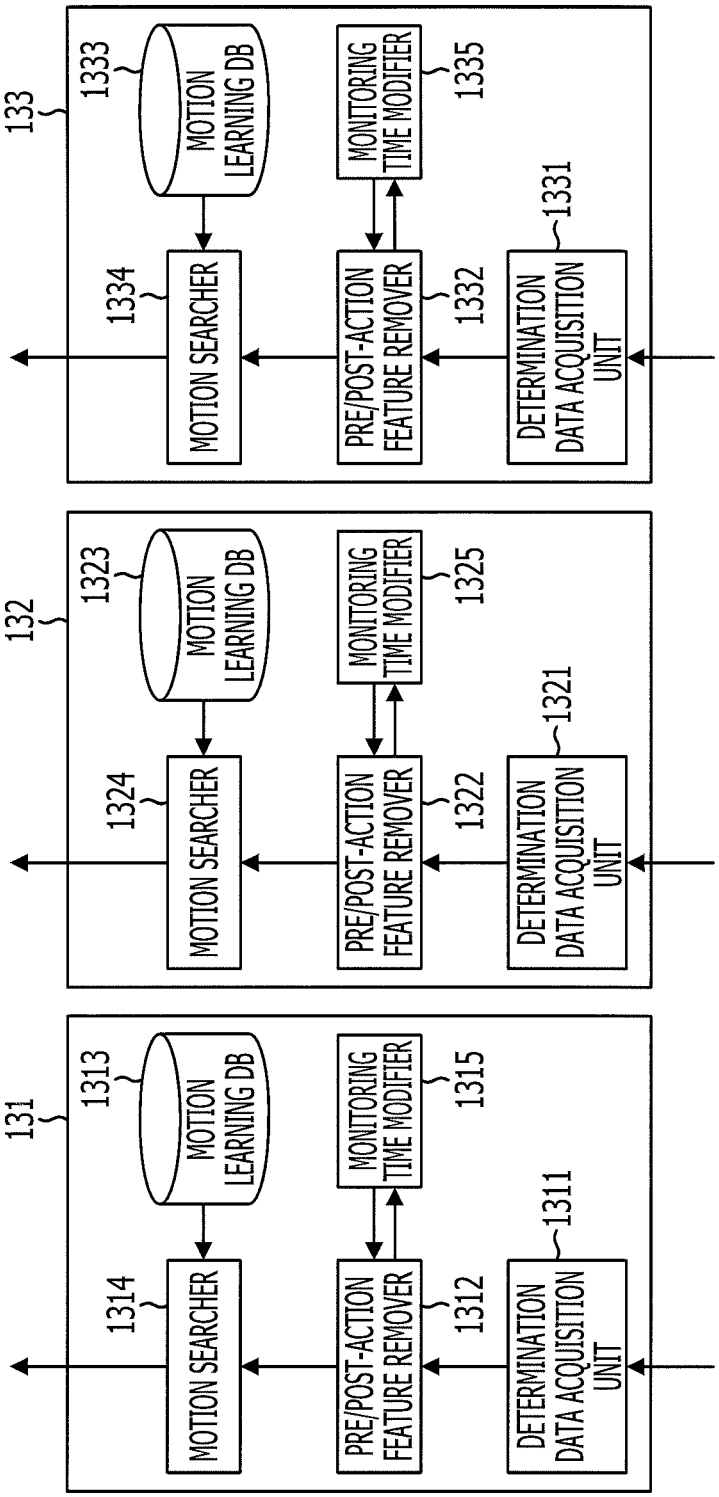
FIG. 18 illustrates a modification of the configuration of the motion determiner.
Figure 19:
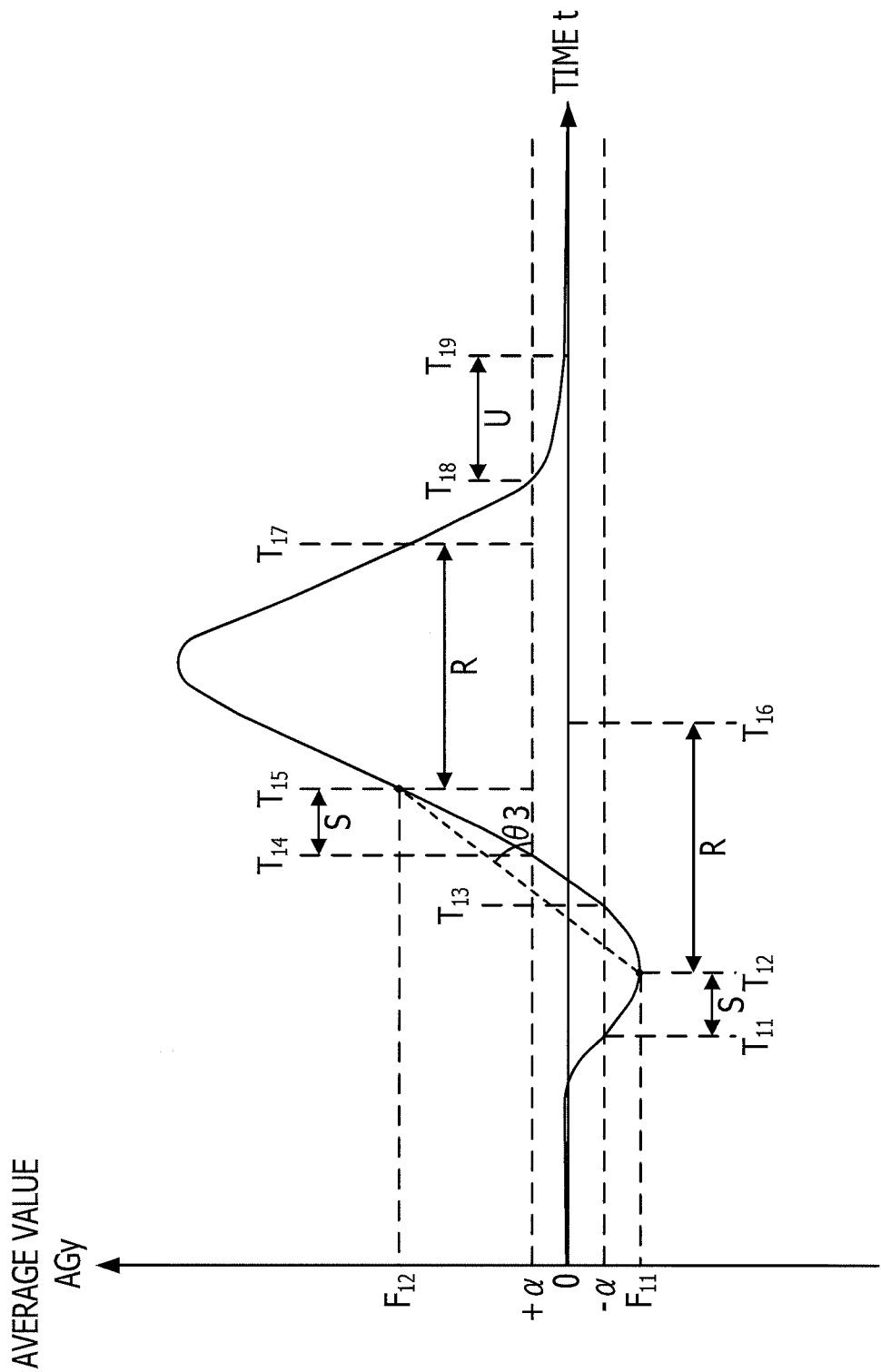
FIG. 19 illustrates an example of an angle $\theta 3$.

FIG. 18 illustrates a modification of the configuration of the motion determiner 103. FIG. 19 illustrates an example of an angle θ3, and FIG. 20 illustrates a relationship between the angle θ3 and the time period R.

The time period R is set to be a constant value in the first method. Alternatively, the time period R may be set in accordance with the first feature quantity average value AGy1 and the second feature quantity average value AGy2 as described below.

As illustrated in FIG. 18, a monitoring time modifier 1325 is arranged in the second motion determiner 132. Similarly, a monitoring time modifier 1315 and a monitoring time modifier 1335 are respectively arranged in the first motion determiner 131 and the third motion determiner 133.

Each time the pre/post-action feature quantity remover 1322 calculates the first feature quantity average value AGy1 and the second feature quantity average value AGy2, the monitoring time modifier 1325 calculates the angle θ3 (acute angle) between a line connecting the first feature quantity average value AGy1 to the second feature quantity average value AGy2 and the zero axis as illustrated in FIG. 19.

As the angle θ3 becomes larger, the monitoring time modifier 1325 sets the time period R to be shorter. For example, according to a rule listed in FIG. 20, the monitoring time modifier 1325 modifies the time period R. These operations by the monitoring time modifier 1325 may be carried out after each of the operations #603 and #608 in FIG. 6A.

The pre/post-action feature quantity remover 1322 performs the first method in accordance with the time period R modified by the monitoring time modifier 1325. At an initial process, the first method starts with an initial value of the time period R.

Similarly, the monitoring time modifier 1315 and the monitoring time modifier 1335 appropriately modify the time period R. The time period R may be separately managed on the first motion determiner 131, the second motion determiner 132, and the third motion determiner 133. In other words, the time period R may be a local variable in each of the first motion determiner 131, the second motion determiner 132, and the third motion determiner 133.

The time period R may be modified in accordance with the angle θ1 and the angle θ2 illustrated in FIG. 17 instead of the angle θ3. More specifically, the time period R from time T12 to time T16 may be modified in response to the angle θ1 and the time period R from time T15 to time T17 may be modified in response to the angle θ2. The time period R may be modified on a per time duration basis in response to the angle in the immediately preceding time period S (the angles θ1 and θ2). In such a case, a new time period R may be recalculated each time a previous time period R has elapsed.

Process of different motions determined by plurality of motion determiners can be provided.

Figure 21:
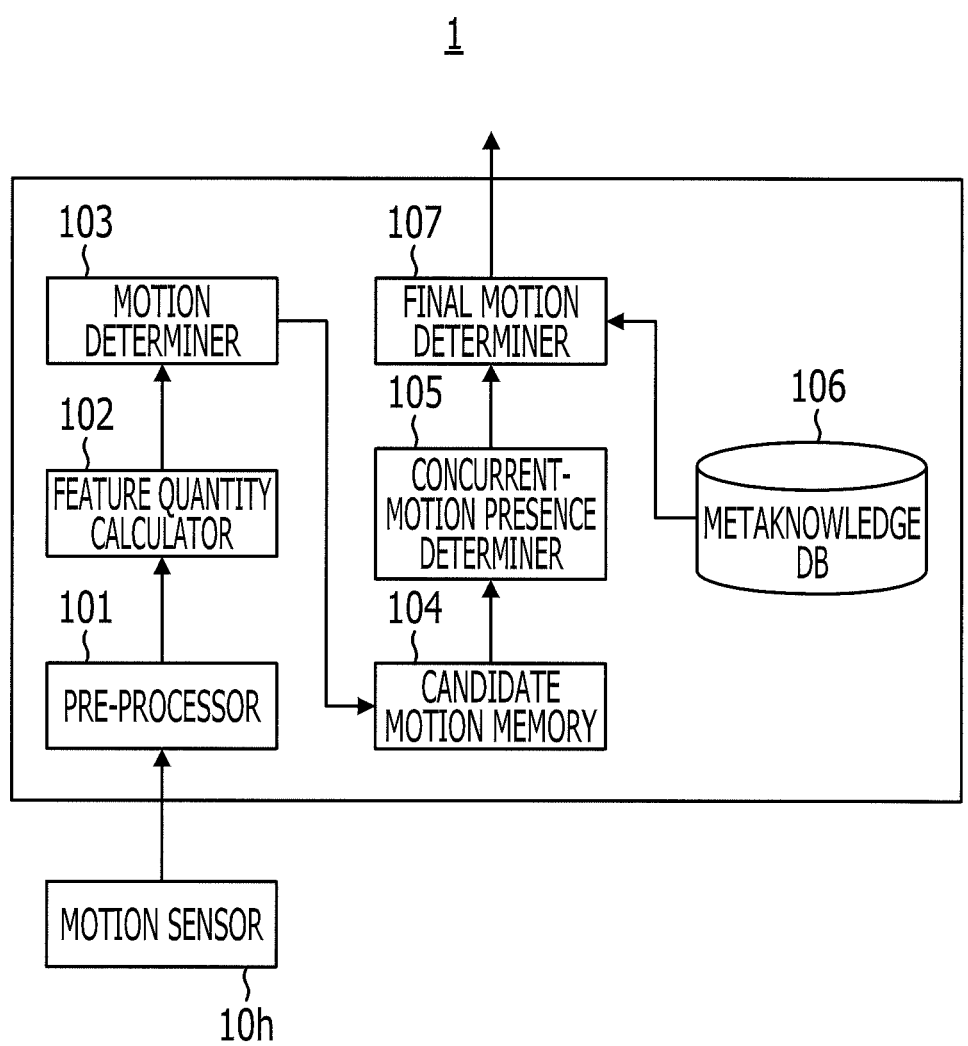
FIG. 21 illustrates a modification of the functional configuration of the mobile terminal.
Figure 22:
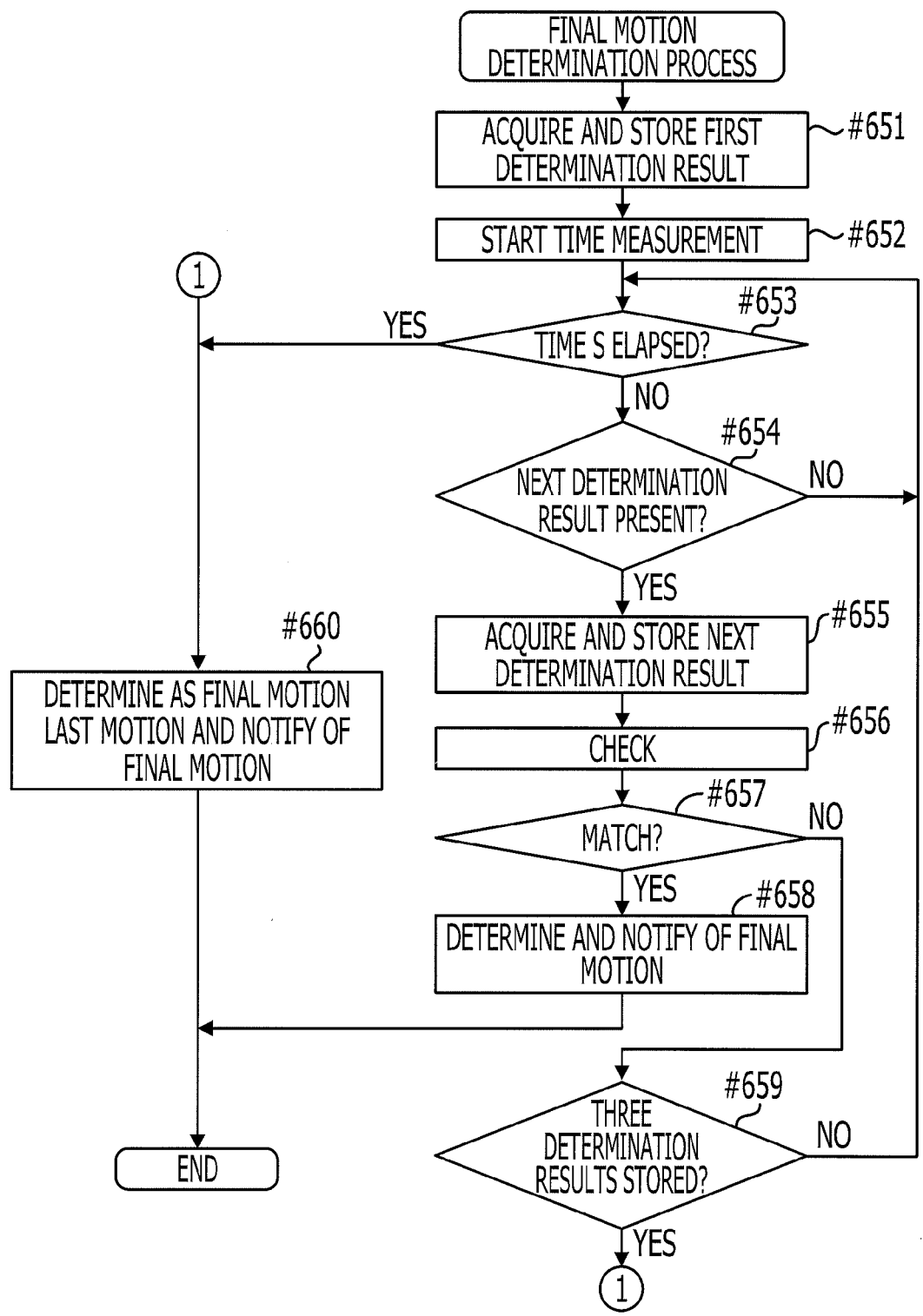
FIG. 22 is a flowchart illustrating an example of the process flow of a final motion determination process.

FIG. 21 illustrates a modification of the functional configuration of the mobile terminal 1. FIG. 22 is a flowchart illustrating a process flow of a final motion determination. FIG. 23 illustrates a meta knowledge database 106 and meta knowledge data 58.

As illustrated in FIG. 1, the mobile terminal 1 has a rectangular parallelepiped shape. If the user moves the mobile terminal 1 in parallel along any of the sides thereof, only a motion determiner having the axis thereof in parallel with the side ideally determines a motion. For example, if the user moves the mobile terminal 1 in the width direction thereof, only the second motion determiner 132 determines the motion.

The user may now move the mobile terminal 1 to attempt to perform a motion. The motion, which is to be determined by one motion determiner only, might be determined by another motion determiner.

If that happens, there is a possibility that a process intended by the user may not be performed or a process unintended by the user may be performed in an application that is executed in response to determination results of the first motion determiner 131 through the third motion determiner 133.

The motion based on the final determination results of the motion determiner 103 may be determined in accordance with the determination results of the first motion determiner 131 through the third motion determiner 133. The motion determined by one or more of the first motion determiner 131 through the third motion determiner 133 is referred to as a "candidate motion," and the motion as the final determination results is referred to as a "final motion."

As illustrated in FIG. 21, the mobile terminal 1 further includes candidate motion memory 104, concurrent-motion presence determiner 105, meta knowledge database (DB) 106, and final motion determiner 107.

The functions and process flow of the candidate motion memory 104 through the final motion determiner 107 are described below with reference to a flowchart of FIG. 22.

If one or more of the first motion determiner 131, the second motion determiner 132, or the third motion determiner 133 has determined a candidate motion, the candidate motion is stored on the candidate motion memory 104 (#651 in FIG. 22).

The concurrent-motion presence determiner 105 measures time, starting with a first candidate motion stored on the candidate motion memory 104 (#652). The concurrent-motion presence determiner 105 monitors the candidate motion determination by another motion determiner until a specific time has elapsed (no from #653), and thus determines whether a plurality of determinations has been performed substantially at the same time (more strictly, within a specific time period).

If a candidate motion has been determined by another motion determiner within the specific time period (yes from #654), that candidate motion (a second candidate motion here) is stored on the candidate motion memory 104 (#655).

The candidate motions stored on the candidate motion memory 104 are mapped to determination times thereof.

As illustrated in FIG. 23, the meta knowledge data 58 is stored on the meta knowledge database 106. The phrase "forward tilt" in FIG. 23 means that the user tilts the mobile terminal 1 in a manner such that the upper portion of the mobile terminal 1 gets closer to themselves. The phrase "backward tilt" means that the user tilts the mobile terminal 1 in a manner such that the upper portion of the mobile terminal 1 is far away from themselves. The phrase "right tilt" means that the user tilts the mobile terminal 1 in a manner such that the right side of the upper portion of the mobile terminal 1 is far away from themselves. The phrase "left tilt" means that the user tilts the mobile terminal 1 in a manner such that the left side of the upper portion of the mobile terminal 1 is far away from themselves.

The meta knowledge data 58 is prepared for each combination of a plurality of candidate motions that are likely to be determined as happening substantially at the same time.

The meta knowledge data 58 includes four fields, i.e., a "first motion" field, a "second motion" field, a "third motion" field, and a "final motion" field.

The "first motion" field, the "second motion" field, and the "third motion" field respectively list a candidate motion determined first, a candidate motion determined second, and a candidate motion determined third if a plurality of candidate motions are determined at the same period.

The "final motion" field lists a motion that the user is supposed to intend if the candidate motions respectively listed in the "first motion" field, the "second motion" field, and the "third motion" field occur in that order during the same period.

Returning to the flowchart of FIG. 22, the final motion determiner 107 searches for the meta knowledge data 58 in which the first determined candidate motion matches the motion listed in the "first motion" field, and the second determined candidate motion matches the motion listed in the "second motion" field" (#656).

If a single unit of meta knowledge data 58 is hit (yes from #657), the final motion determiner 107 determines, as the final motion, the motion indicated by the "final motion" field of the meta knowledge data 58, and then notifies the application of the final motion (#658).

If no such meta knowledge data 58 is hit, or a plurality of units of meta knowledge data 58 is hit (no from #657), the final motion determiner 107 waits until a next candidate motion (a third candidate motion here) is determined within a time elapse of a specific time period from the storage of the first candidate motion (no from #653).

The third candidate motion, if determined, is stored on the candidate motion memory 104 (#655).

The final motion determiner 107 then searches for the meta knowledge data 58 in which the first determined candidate motion matches the motion listed in the "first motion" field, the second determined candidate motion matches the motion listed in the "second motion" field," and the third determined candidate motion matches the motion listed in the "third motion" field (#656).

If such meta knowledge data 58 is hit (yes from #657), the final motion determiner 107 determines as the final motion the motion listed at the "final motion" field, and then notifies the application of the final motion (#658).

If no such meta knowledge data 58 is hit (no from #657), the final motion determiner 107 determines as the final motion the candidate motion determined last (the third candidate motion here) and notifies the application of the final motion (#660).

The final motion may not be determined based on the meta knowledge data 58 until the specific time period has elapsed since the first candidate motion was stored (yes from #653). Even in this case, the final motion determiner 107 determines, as the final motion, last candidate motion and notifies the application of the final motion (#660).

Modification of process of different motions determined by plurality of motion determiners is described.

Figure 24:
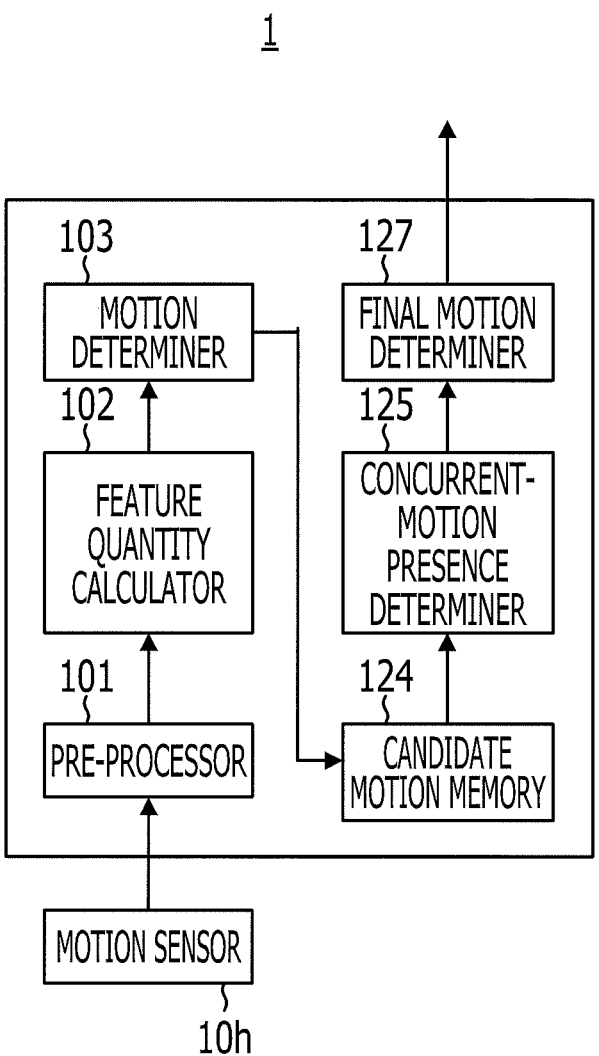
FIG. 24 illustrates a modification of the functional configuration of the mobile terminal.
Figure 25:
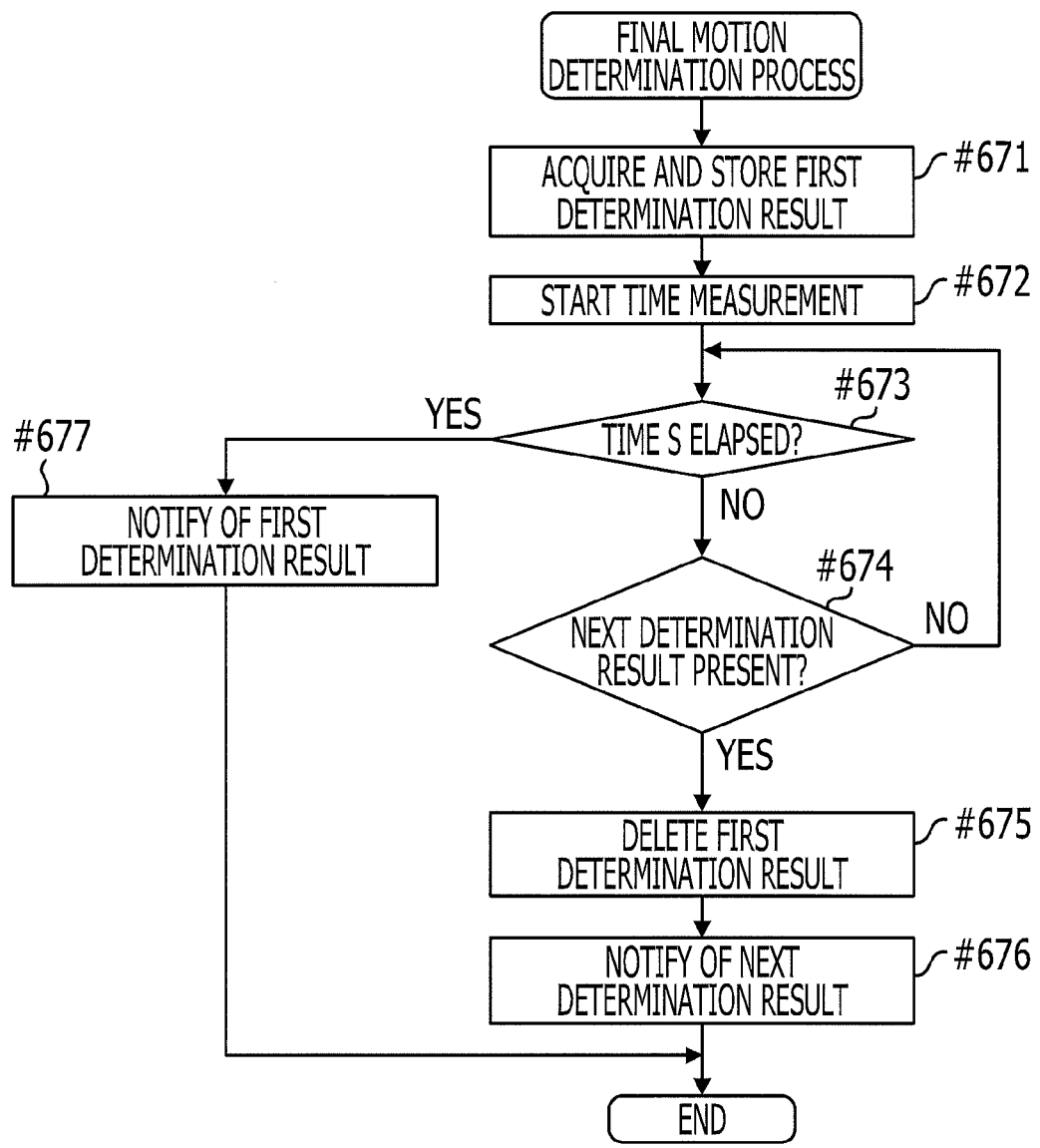
FIG. 25 is a flowchart illustrating an example of the process flow of a final motion determination.

FIG. 24 illustrates a modification of the functional configuration of the mobile terminal 1, and FIG. 25 is a flowchart illustrating an example of the process flow of the final motion determination process.

If a plurality of candidate motions is determined almost concurrently, a candidate motion unintended by the user typically occurs slightly earlier than a candidate motion intended by the user.

In such a case, a first candidate motion may be deleted, and the application may be notified of a second and subsequent candidates.

As illustrated in FIG. 24, the mobile terminal 1 further includes candidate motion memory 124, concurrent-motion presence determiner 125, and final motion determiner 127.

The functions and operations of the candidate motion memory 124, the concurrent-motion presence determiner 125, and the final motion determiner 127 are described with reference to the flowchart of FIG. 25.

If one or more of the first motion determiner 131, the second motion determiner 132, or the third motion determiner 133 has determined a candidate motion, the candidate motion is stored on the candidate motion memory 124 (#671 in FIG. 25).

The concurrent-motion presence determiner 105 measures time, starting with the first candidate motion stored on the candidate motion memory 104 (#672). The concurrent-motion presence determiner 105 monitors the candidate motion determination by another motion determiner until a specific time has elapsed (no from #673), and thus determines whether a plurality of determinations has been performed substantially at the same time.

If a candidate motion has been determined by another motion determiner within the specific time period (yes from #674), the final motion determiner 127 notifies the application of each of the candidate motions as final motion (#676). The first motion stored on the candidate motion memory 124 is deleted (#675).

If no candidate motion is determined by any other motion determiner within the specific time (yes from #673), the application is notified of the first candidate motion stored on the candidate motion memory 124 as the final motion (#677).

Selection of determination results in response to application is described.

Figure 26:
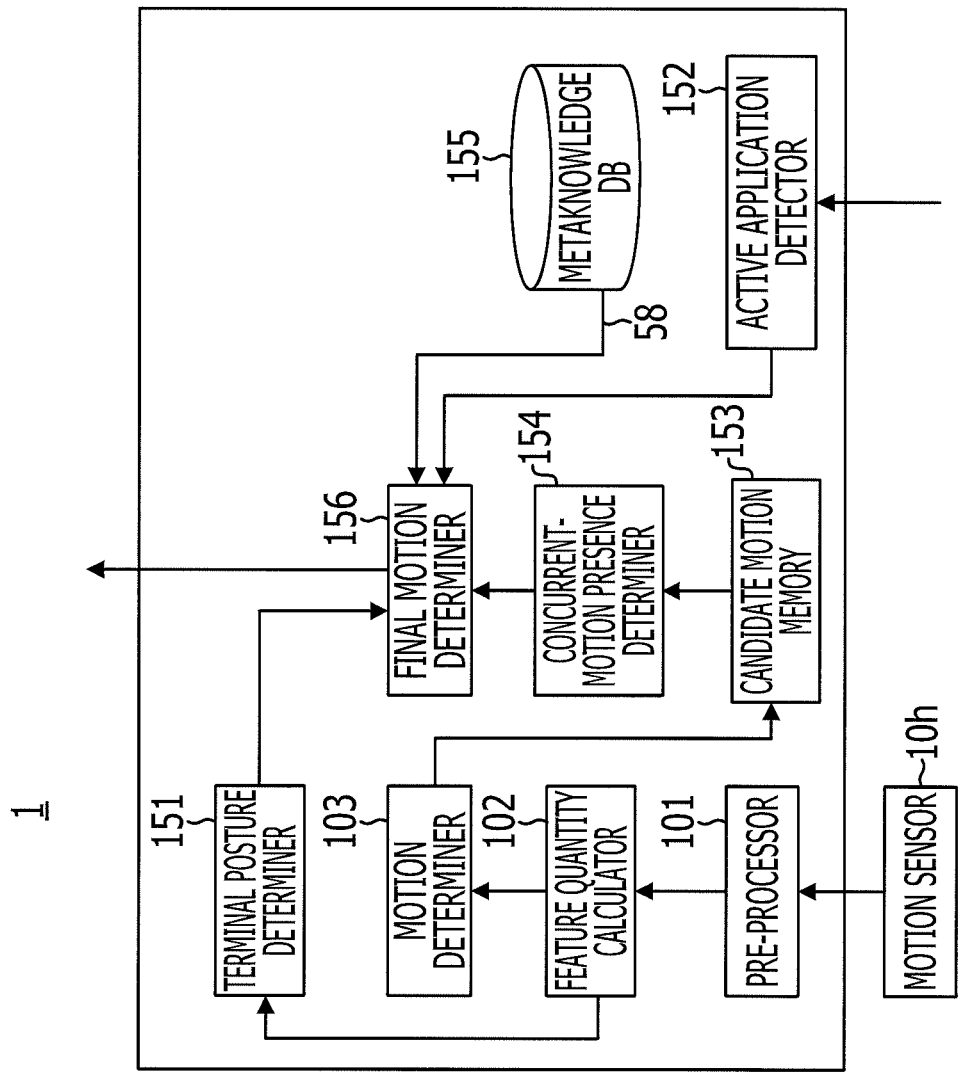
FIG. 26 illustrates a modification of the functional configuration of the mobile terminal.
Figure 27A:
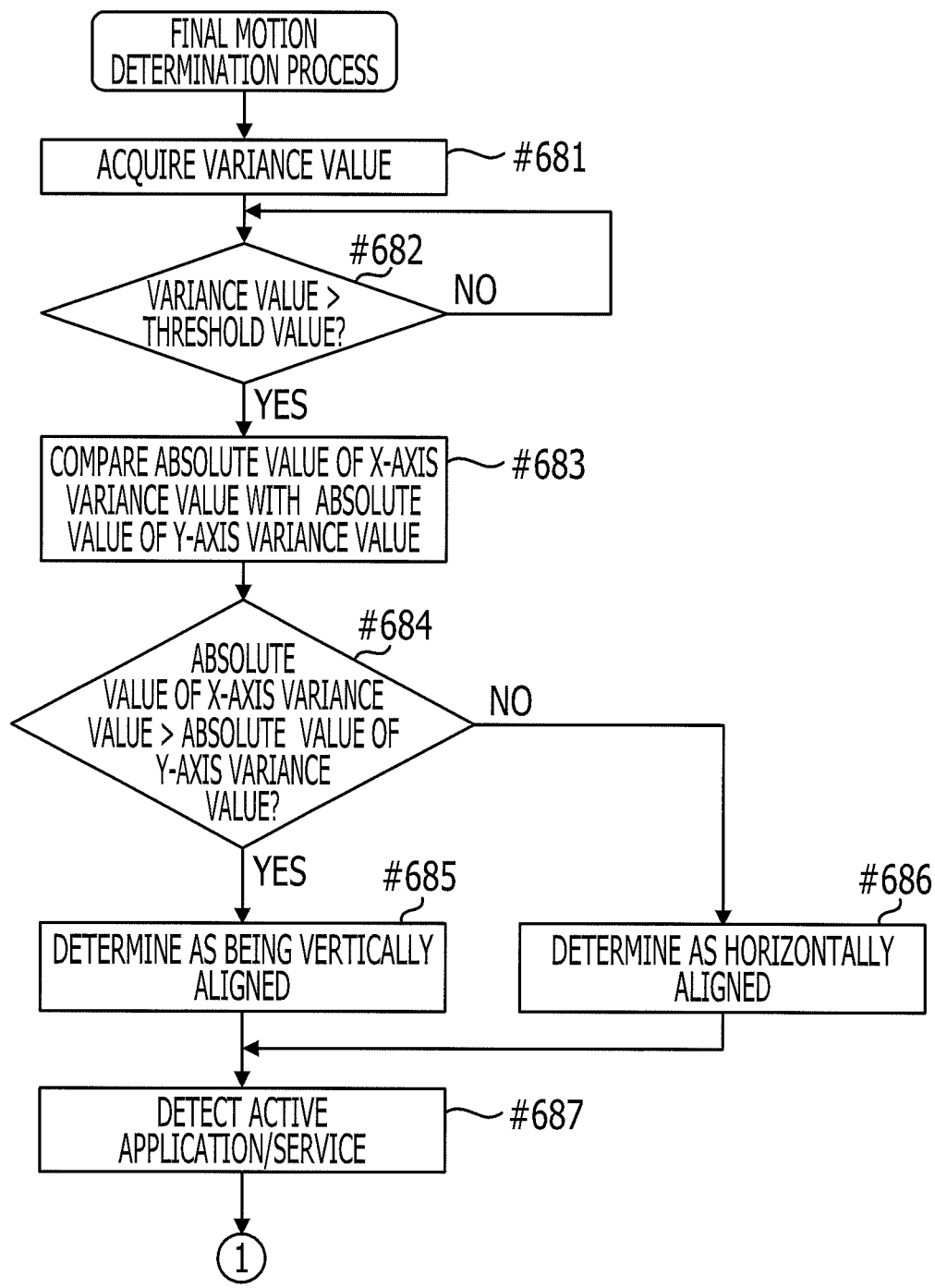
FIGS. 27A and 27B are a flowchart illustrating an example of the process flow of a final motion determination process.
Figure 27B:
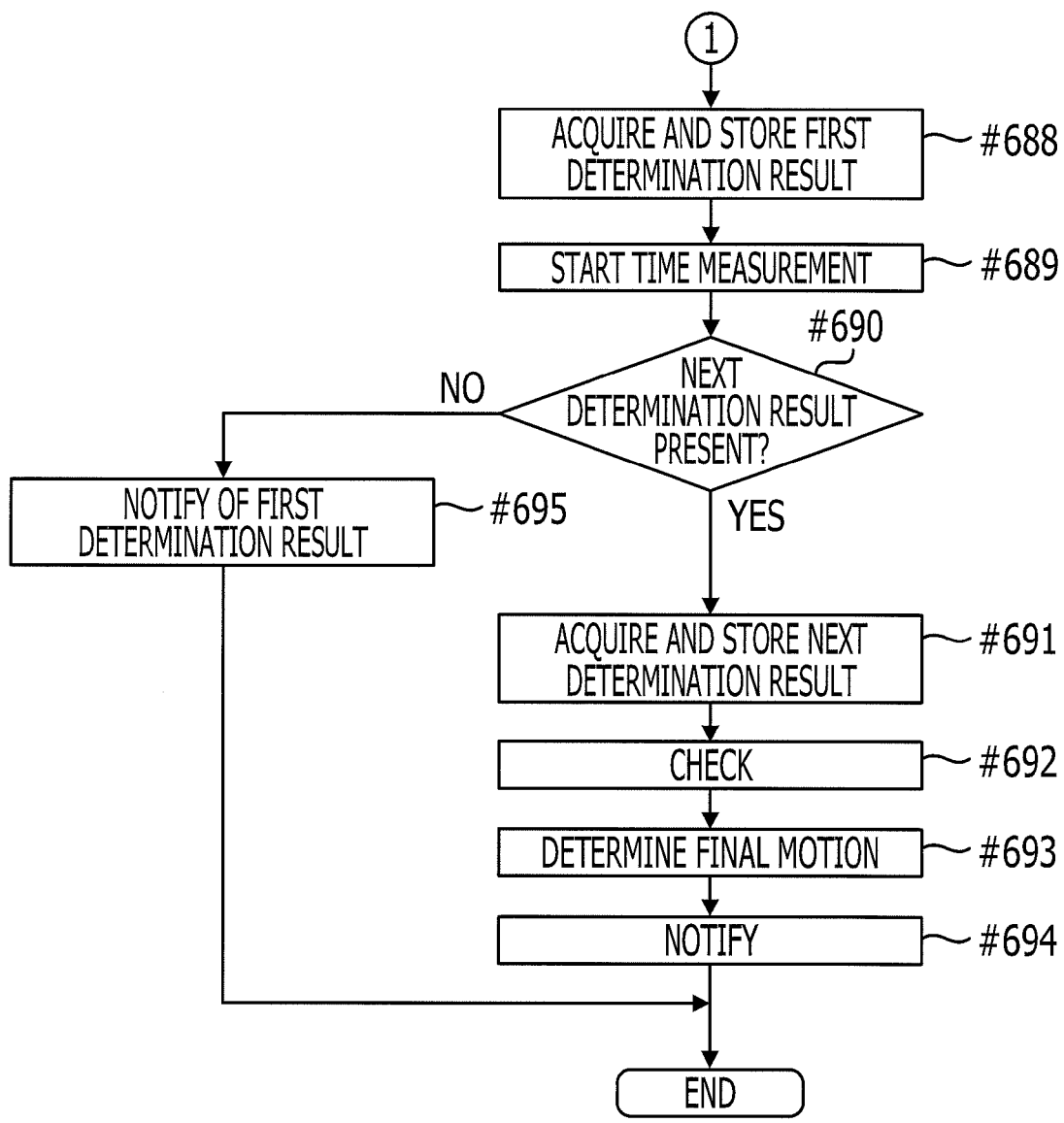
Figure 28A:
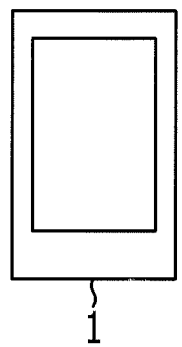
FIGS. 28A and 28B illustrate a posture of the mobile terminal.
Figure 28B:
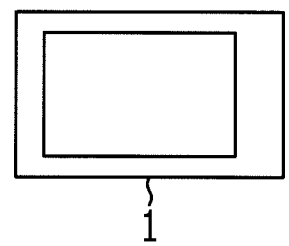

FIG. 26 illustrates a modification of the functional configuration of the mobile terminal 1. FIGS. 27A and 27B are a flowchart illustrating a process flow of a final motion determination process. FIGS. 28A and 28B illustrate an example of the posture of the mobile terminal 1. FIGS. 29A-29C illustrates a posture table TL1, an application-based active axis table TL2, and a motion candidate table TL3.

The degree of importance of the candidate motion of the first motion determiner 131 to the third motion determiner 133 may change depending on application or service. For example, the detection of a motion in the vertical direction is the most important in the application of the PEDOMETER.

The application or service in operation may be notified of the candidate motion of each of the first motion determiner 131 to the third motion determiner 133 described below.

As illustrated in FIG. 26, the mobile terminal 1 further includes terminal posture determiner 151, active application detector 152, candidate motion memory 153, concurrent-motion presence determiner 154, meta knowledge database 155, and final motion determiner 156.

The functions and operations of the terminal posture determiner 151 through the final motion determiner 156 are described below with reference to the flowchart of FIGS. 27A and 27B.

The terminal posture determiner 151 determines a posture of the mobile terminal 1 based on the variance value and the average value calculated by the feature quantity calculator 102.

For example, the terminal posture determiner 151 acquires the variance values of all the axes (#681). If the sum of the variance values of all the axes is less than a threshold value (yes from #682 in FIG. 27A), the absolute value of the average value of the X axis is compared with the absolute value of the average value of the Y axis (#683).

If the absolute value of the average value of the X axis is higher than the absolute value of the average value of the Y axis (yes from #684), the terminal posture determiner 151 determines that the mobile terminal 1 is aligned in the vertical direction as illustrated in FIG. 28A (#685). If not (no from #684), the terminal posture determiner 151 determines that the mobile terminal 1 is aligned in the horizontal direction (#686).

In parallel with or subsequent to or prior to the process of the terminal posture determiner 151, the active application detector 152 detects an application or a service in operation (#687).

If one or more of the first motion determiner 131, the second motion determiner 132, or the third motion determiner 133 has determined a candidate motion, the candidate motion is stored on the candidate motion memory 153 (#688 in FIG. 27B).

The concurrent-motion presence determiner 154 measures time, starting with a first candidate motion stored on the candidate motion memory 153 (#689). The concurrent-motion presence determiner 154 monitors the candidate motion determination by another motion determiner until a specific time has elapsed, and thus determines whether a plurality of determinations has been performed substantially at the same time (more strictly, within a specific time period).

If a candidate motion has been determined by another motion determiner within the specific time period (yes from #690), that candidate motion (a second candidate motion here) is stored on the candidate motion memory 153 (#691).

The meta knowledge database 155 stores the posture table TL1, the application-based active axis table TL2, and the motion candidate table TL3.

As illustrated in FIG. 29A, the posture table TL1 lists which of the X axis, the Y axis, and the Z axis is aligned with an up-down axis (vertical axis), and fore-aft axis on each of the postures of the mobile terminal 1.

As illustrated in FIG. 29B, the application-based active axis table TL2 lists a particularly important axis (active axis) and an unneeded axis (inactive axis) from among axes in the up-down direction, the fore-aft direction, and the lateral direction (hereinafter referred to as the up-down axis, the fore-aft axis, and the lateral axis) on a per application basis or on a per service basis.

As illustrated in FIG. 29C, the motion candidate table TL3 lists motions considered as being intended by the user when a motion in each of the X axis, the Y axis, and the Z axis is detected.

Returning to the flowchart, the final motion determiner 156 determines the final motion by checking a plurality of candidate motions determined in the specific time, the posture determined by the terminal posture determiner 151, one of the application or the service detected by the active application detector 152, and the tables stored on the meta knowledge database 155 (#692 and #693) as described below.

The final motion determiner 156 extracts a record indicating the posture by checking the posture determined by the terminal posture determiner 151 against the posture table TL1. The final motion determiner 156 then selects the axis corresponding to the "active axis" in the extracted record. For example, the application of the pedometer (registered trademark) may be detected, and the posture may be "vertical." The final motion determiner 156 then selects the X axis, and determines as the final motion a candidate motion responsive to the selected axis. If the motion candidate table TL3 lists a motion corresponding to the selected axis, the final motion determiner 156 determines as the final motion that motion.

The final motion determiner 156 selects the axis corresponding to the "inactive axis" in the extracted record. For example, the service of the motion UI may be detected, and the posture may be "horizontal." The final motion determiner 156 then selects the Z axis, and then deletes a candidate motion corresponding to the selected axis, and determines as the final motion a motion in an axis other than that axis. If the motion candidate table TL3 lists a motion corresponding to an axis other than that axis, the final motion determiner 156 determines as the final motion that motion.

The final motion determiner 156 notifies the application and/or the service of the determined final motion (#694).

If no candidate motion is determined by any other motion determiner within the specific time (no from #690), the final motion determiner 156 determines as the final motion the first candidate motion, and notifies one of the application and the service of the final motion (#695).

User-based adjustment of meta knowledge database 106 is described.

Figure 30:
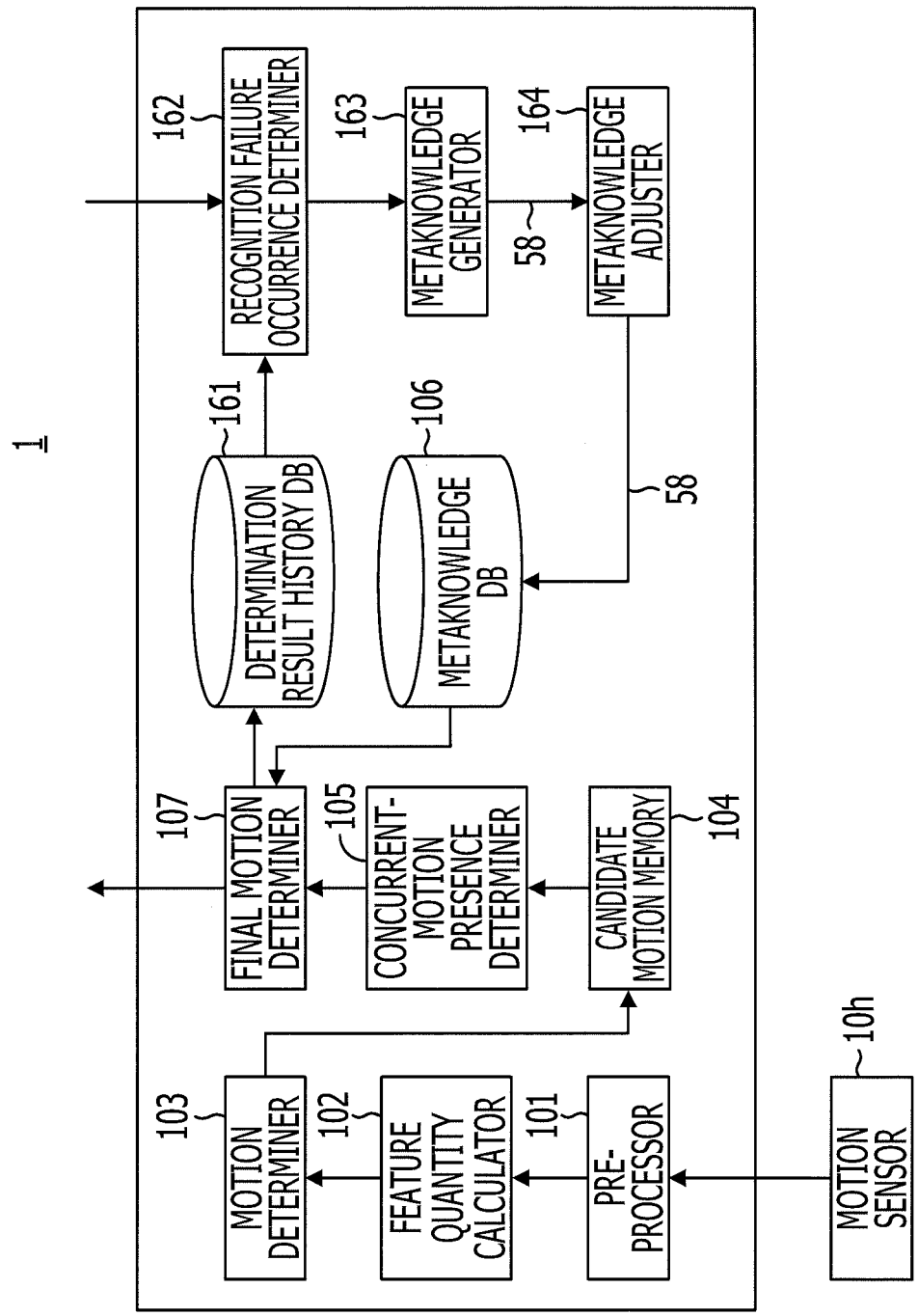
FIG. 30 illustrates a modification of the functional configuration of the mobile terminal.
Figure 31:
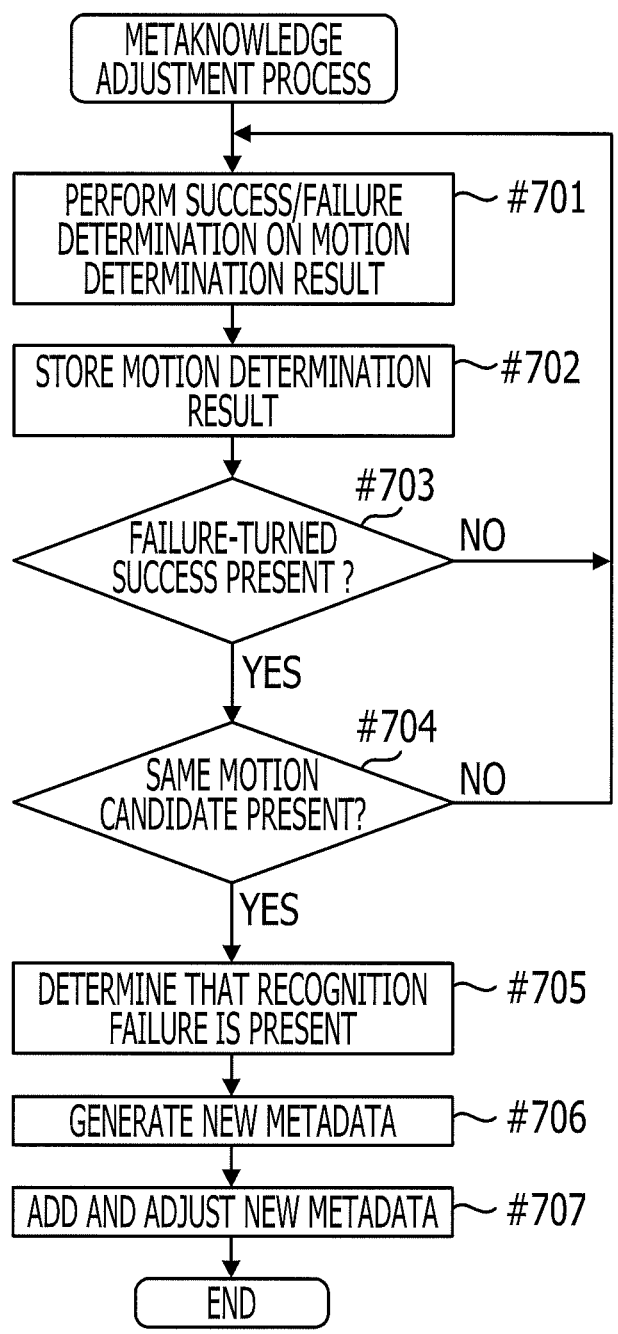
FIG. 31 is a flowchart illustrating an example of the process flow of a meta knowledge adjustment process.

FIG. 30 illustrates a modification of the functional configuration of the mobile terminal 1. FIG. 31 is a flowchart illustrating a process flow of a meta knowledge adjustment process. FIG. 32 illustrates the final motion and success/failure determination results thereof.

The meta knowledge database (DB) 106 stores a plurality of units of meta knowledge data 58 as illustrated in FIG. 23. The content of the meta knowledge data 58 is determined beforehand based on typical human activities.

However, if an extremely slow-moving user or an extremely quick-moving user uses the mobile terminal 1, the motion of the mobile terminal 1 is not necessarily determined as expected.

The mobile terminal 1 may be structured as described below to customize the concurrent-motion presence determiner 105.

As illustrated in FIG. 30, the mobile terminal 1 further includes determination result history database 161, recognition failure occurrence determiner 162, meta knowledge generator 163, and meta knowledge adjuster 164.

The functions and operations of the determination result history database 161 through the meta knowledge adjuster 164 are described below with reference to the flowchart of FIG. 31.

The final motion determined by the final motion determiner 107 is stored together with the concurrently determined candidate motion on the determination result history database 161.

The recognition failure occurrence determiner 162 determines whether the final motion stored on the determination result history database 161 is correct or not (#701 in FIG. 31).

After the final motion is sent to the application, a specific operation such as pressing a cancel button may be performed within a short time (within 1 second, for example). In such a case, the recognition failure occurrence determiner 162 determines that the final motion is in error. If no such an operation is performed, the recognition failure occurrence determiner 162 determines that the final motion is correct.

As illustrated in FIG. 32, the success/failure determination results are mapped to the final motion, and then stored on the determination result history database 161 (#702).

The meta knowledge generator 163 determines whether, in succession to an erroneous final motion (hereinafter referred to as a "first final motion"), a correct final motion (hereinafter referred to as a "second final motion") is stored on the determination result history database 161 until other final motions of a constant number (of three final motions, for example) are determined, or within a constant period of time (10 seconds, for example). If such two final motions are present (yes from #703), candidate motions mapped to the two final motions on each axis are compared.

If the candidate motion on any of the axes is identical, the meta knowledge generator 163 estimates that the first final motion has been determined although the user has attempted to perform the second final motion. The meta knowledge generator 163 thus generates each candidate motion corresponding to the first final motion, and the meta knowledge data 58 indicating the second final motion.

The meta knowledge adjuster 164 stores the generated meta knowledge data 58 on the meta knowledge database 106. Meta knowledge is thus adjusted.

With reference to FIG. 32, in succession to the first final motion erroneously determined as the "forward tilt," the immediately subsequent second final motion is common to the candidate motion of the Y axis. The meta knowledge generator 163 thus generates the meta knowledge data 58 that indicates the candidate motions of the X axis, the Y axis, and the Z axis for the first final motion, and indicates the second final motion as the final motion.

Use of final motion in application is described.

FIG. 33 illustrates a relationship between the application and a motion and/or gesture to the mobile terminal.

The application performs a process in response to the candidate motion or the final motion determined by the motion determiner 103, and the final motion determiners 107, 127, and 156. FIG. 33 illustrates examples of motions and/or gestures with respect to a mobile terminal and corresponding operations.

According to each of the embodiments, the motion that the user has intended is more reliably determined than ever before. In particular, the characteristics of the habit of each user is removed, and determination reliability is increased.

The elements illustrated in FIG. 3 may be implemented in an integrated circuit (IC) and/or large scale integration (LSI).

The casing of the mobile terminal 1 of the embodiment has a rectangular parallelepiped shape as illustrated in FIG. 1. However, other mobile terminal shapes can be provided. The invention is applicable to a folding mobile terminal structure.

The invention is applicable not only to the mobile terminal but also to a variety of mobile devices including a cellular phone, a personal digital assistant (PDA), and a mobile game playing device.

Part or whole of the configuration of the mobile terminal 1, and the process content, and the operation order of the mobile terminal 1, the structure of each table, and values of the table may be modified in accordance with the spirit of the invention.

The motion determiner may determine the motion based on one of the feature quantities having the highest absolute value. The motion determiner may determine the motion based on one of the feature quantities having an immediately prior rate of change having the highest absolute value.

The above-described feature quantity may be an average value of accelerations within a specific period of time or of a specific number of accelerations.

According to an aspect of the embodiments of the invention, any combinations of one or more of the described features, functions, operations, and/or benefits can be provided. The embodiments can be implemented as an apparatus (a machine) that includes computing hardware (i.e., computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use computing hardware and/or software. The apparatus (e.g., the mobile terminal 1) can comprise a controller (CPU) (e.g., a hardware logic circuitry based computer processor that processes or executes instructions, namely software/program), computer readable media, transmission communication interface (network interface), and/or an output device, for example, a display device, all in communication through a data communication bus. In addition, an apparatus can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing one or more apparatuses and/or computer processors to execute the described operations. The results produced can be output to an output device, for example, displayed on the display.

A program/software implementing the embodiments may be recorded on a computer-readable media, e.g., a non-transitory or persistent computer-readable medium. Examples of the non-transitory computer-readable media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc—Read Only Memory), and a CD-R (Recordable)/RW. The program/software implementing the embodiments may be transmitted over a transmission communication path, e.g., a wire and/or a wireless network implemented via hardware. An example of communication media via which the program/software may be sent includes, for example, a carrier-wave signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

The invention claimed is:

1. A motion determination apparatus, comprising:
   a computer processor to execute:
      acquiring, at intervals, detection information, which indicate a change in a position and/or a posture, of a motion sensor and/or a device including the motion sensor, and storing the detection information with acquisition time information of the detection information mapped to the detection information;
      calculating from the detection information a plurality of feature quantities indicating features at a plurality of different time points; and
      determining a motion applied to the motion sensor and/or the device including the motion sensor, in response to a feature quantity selected from among the plurality of calculated feature quantities,
   wherein the calculating:
      calculates one of the feature quantities from the detection information at a specific time period later than a time period when a value of the detection information rises above a specific value, and
      calculates, for detection of a transition, another one of the feature quantities from the detection information at a specific time period later than a time period when a value of the detection information rises again above the specific value after the value of the detection information falls below the specific value.

2. The motion determination apparatus according to claim 1, wherein the calculating calculates a feature quantity from a peak value of a ridge or a bottom of the detection information.

3. The motion determination apparatus according to claim 1, wherein the determining determines the motion based on a largest value of the plurality of feature quantities.

4. The motion determination apparatus according to claim 1, wherein the determining determines the motion based on one of the plurality of feature quantities having an immediately preceding rate of change with largest value.

5. The motion determination apparatus according to claim 4, wherein the computer processor corrects a specific time point by shortening the specific time point more as the rate of change is higher.

6. The motion determination apparatus according to claim 1, wherein the computer processor:
   accesses a motion relation storage that stores a combination of determined motions with a finally determined motion mapped thereto,
   references a combination of motions respectively represented by the calculated plurality of feature quantities, and
   determines as the motion a finally determined motion mapped to the combination of determined motions that match the referenced combination of motions.

7. The motion determination apparatus according to claim 1, wherein the motion determiner determines the motion in response to an application and/or a service in which the motion sensor and/or the device including the motion sensor is used, and/or in response to a posture of the motion sensor and/or the device including the motion sensor.

8. The motion determination apparatus according to claim 1, wherein the computer processor:

accesses a determination history storage that stores a failure determination motion erroneously determined and a success determination motion correctly determined, selects from among success determination motions a common determination motion, determined by a specific number of times of a success determination motion and/or a success determination motion within a specific period of time, after a failure determination motion, and/or a motion common to any of the erroneously determined failure motions and success determination motions, to serve as a base motion;

stores the common determination motion and/or the base motion as a final motion.

9. A motion determination method of a motion determination apparatus, comprising:

acquiring, at intervals, detection information, which indicate a change in a position and/or a posture, of a motion sensor and/or a device including the motion sensor, and storing the detection information with acquisition time information of the detection information mapped to the detection information;

calculating, by a computer processor, from the detection information a plurality of feature quantities indicating features at a plurality of different time points; and determining a motion applied to the motion sensor and/or the device including the motion sensor, in response to a feature quantity selected from among the plurality of calculated feature quantities, wherein the calculating:

calculates a feature quantity from the detection information at a specific time period later than a time period when a value of the detection information rises above a specific value, and calculates, for detection of a transition, another feature quantity from the detection information at a specific time period later than a time period when a value of the detection information rises again above the specific value after the value of the detection information falls below the specific value.

10. A non-transitory recording medium storing a program for causing a motion determination apparatus to perform a motion determination comprising:

acquiring, at intervals, detection information, which indicate a change in a position and/or a posture, of a motion sensor and/or a device including the motion sensor, and storing the detection information with acquisition time information of the detection information mapped to the detection information;

calculating from the detection information a plurality of feature quantities indicating features at a plurality of different time points; and determining a motion applied to the motion sensor and/or the device including the motion sensor, in response to a feature quantity selected from among the plurality of calculated feature quantities, wherein the calculating:

calculates one of the feature quantities from the detection information at a specific time period later than a time period when a value of the detection information rises above a specific value, and calculates, for detection of a transition, another one of the feature quantities from the detection information at a specific time period later than a time period when a value of the detection information rises again above the specific value after the value of the detection information falls below the specific value.

* * * * *